United States Patent
Mitchell et al.

(10) Patent No.: US 9,634,863 B2
(45) Date of Patent: Apr. 25, 2017

(54) SYSTEMS AND METHODS FOR SUPPORTING TWO DIFFERENT PROTOCOLS ON A SAME PHYSICAL CONNECTION

(75) Inventors: Judy Anne Mitchell, Goleta, CA (US); Robert Pearce, Bristol (GB); David Cline, Santa Barbara, CA (US); George B. Yundt, Andover, MA (US)

(73) Assignee: KOLLMORGEN CORPORATION, Radford, VA (US)

( * ) Notice: Subject to any disclaimer, the term of this patent is extended or adjusted under 35 U.S.C. 154(b) by 734 days.

(21) Appl. No.: 13/294,236

(22) Filed: Nov. 11, 2011

(65) Prior Publication Data

US 2013/0121346 A1    May 16, 2013

(51) Int. Cl.
*H04L 12/46* (2006.01)
*H04L 12/66* (2006.01)
*H04L 29/06* (2006.01)

(52) U.S. Cl.
CPC .......... *H04L 12/4625* (2013.01); *H04L 12/66* (2013.01); *H04L 69/163* (2013.01); *H04L 69/18* (2013.01)

(58) Field of Classification Search
None
See application file for complete search history.

(56) References Cited

U.S. PATENT DOCUMENTS

| | | | |
|---|---|---|---|
| 7,024,257 B2 | 4/2006 | Pearce et al. | |
| 7,143,301 B2 | 11/2006 | Pearce et al. | |
| 7,406,354 B2 | 7/2008 | Pearce et al. | |
| 7,460,471 B2 | 12/2008 | Pearce et al. | |
| 7,627,455 B2* | 12/2009 | Lenz et al. | 702/183 |
| 7,969,985 B1 | 6/2011 | Cline et al. | |
| 2002/0095449 A1* | 7/2002 | Gabet et al. | 708/3 |
| 2002/0101842 A1* | 8/2002 | Harrison | H04L 12/4625 370/338 |
| 2003/0023723 A1* | 1/2003 | Griech | 709/224 |

(Continued)

FOREIGN PATENT DOCUMENTS

| | | |
|---|---|---|
| CN | 1314255 C | 5/2007 |
| CN | 100477864 C | 4/2009 |
| CN | 101488926 A | 7/2009 |

OTHER PUBLICATIONS

Corresponding International Search Report dated Sep. 21, 2012 (three (3) pages).

(Continued)

*Primary Examiner* — Marsha D Banks Harold
*Assistant Examiner* — Christopher Wyllie
(74) *Attorney, Agent, or Firm* — Day Pitney LLP

(57) ABSTRACT

Systems and methods of supporting communications over a common network connection in a master-slave field bus network with a first type of packet formatted with a time-sensitive protocol and a second type of packet formatted with a non-time-sensitive protocol are provided. The slave devices are configured with filters to prevent the first type of packet from reaching a configurator and the second type from reaching a master device. The slave devices are also configured with arbitration logic so that the packets formatted with the time-sensitive protocol are provided with a priority over the packets formatted with the non-time-sensitive protocol.

9 Claims, 20 Drawing Sheets

(56) References Cited

U.S. PATENT DOCUMENTS

| | | | |
|---|---|---|---|
| 2003/0023795 A1* | 1/2003 | Packwood | H04L 69/18 710/105 |
| 2004/0138786 A1* | 7/2004 | Blackett et al. | 700/295 |
| 2005/0071530 A1* | 3/2005 | Bandekar et al. | 710/105 |
| 2005/0078682 A1* | 4/2005 | Kim | H04L 65/80 370/395.5 |
| 2005/0078683 A1* | 4/2005 | Page | G10H 1/0058 370/395.5 |
| 2005/0105534 A1 | 5/2005 | Osterling | |
| 2005/0228509 A1* | 10/2005 | James | 700/19 |
| 2007/0043877 A1* | 2/2007 | Seiler | 709/246 |
| 2010/0135311 A1* | 6/2010 | Schneider et al. | 370/402 |
| 2010/0188208 A1* | 7/2010 | Fisher et al. | 340/539.12 |
| 2010/0293241 A1* | 11/2010 | Bishel | 709/206 |
| 2010/0329247 A1* | 12/2010 | Kennedy | H04B 1/7163 370/389 |
| 2012/0102240 A1* | 4/2012 | Wei et al. | 710/30 |
| 2012/0147192 A1* | 6/2012 | Wright et al. | 348/159 |
| 2013/0121346 A1* | 5/2013 | Mitchell | H04L 69/163 370/465 |
| 2013/0262714 A1* | 10/2013 | Wei et al. | 710/30 |

OTHER PUBLICATIONS

Form PCT/ISA/237 (five (5) pages).
EPO, Supplementary European Search Report in counterpart EP Application 12848540.6 issued Jun. 30, 2015.
Knezic, M. et al., "Topology Aspects in EtherCAT Networks", Power and Electronics Motion Control Conference (EPE/PEMC), 2010 14th International, IEEE, pp. T1-1.
International Preliminary Report on Patentability (PCT/IB/326) and (PCT/IB/373) dated May 22, 2014, including Written Opinion (PCT/ISA/237) (seven (7) pages).
SIPO's Search Report issued in corresponding Chinese application No. 201280055490.4, Jan. 25, 2016.
SIPO's First Office Action issued in corresponding Chinese application No. 201280055490.4, Feb. 3, 2016. (with English translation).

* cited by examiner

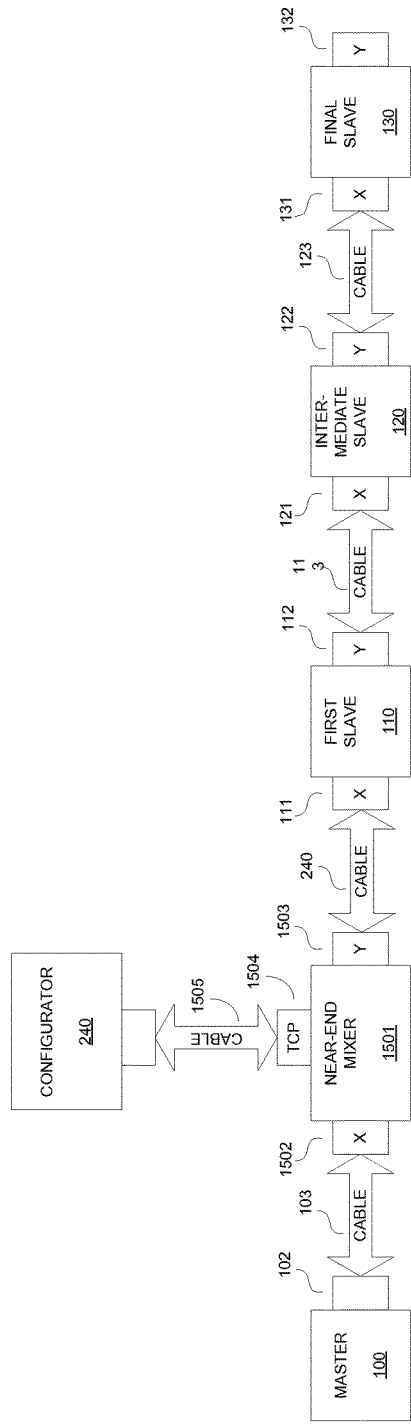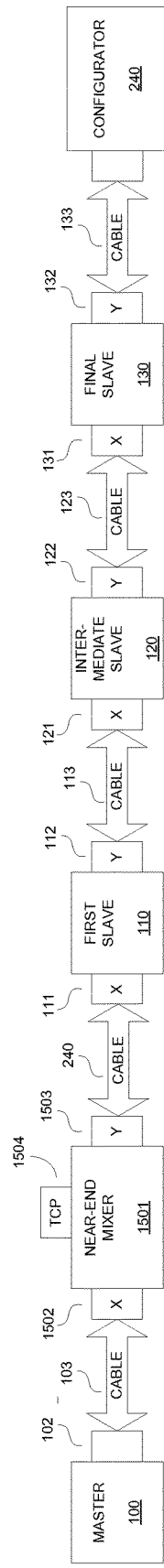
Figure 16a
Figure 16b

SYSTEMS AND METHODS FOR SUPPORTING TWO DIFFERENT PROTOCOLS ON A SAME PHYSICAL CONNECTION

BACKGROUND OF THE INVENTION

Exemplary embodiments of the present invention are directed to systems and methods for supporting two different protocols on the same physical connection in a network of master and slave field bus devices. As used herein, master and slave field bus devices are those that can be connected in a line or ring topology and where the protocol has strict timing requirements. The strict timing requirements can be due to a short time lapse between sending a request and receiving the response in a polled network or due to pre-assigned time slots for the packets in a cyclic network. Additionally, such devices are configured so that there is at least one master device and it either polls the slave devices or else sets up a schedule of cyclic communication.

There are known several field bus communication protocols in this category, including but not limited to EtherCAT (IEC 61158 and IEC 61784-2), SynqNet (such as those disclosed in U.S. Pat. Nos. 7,969,985, 7,460,471, 7,406,354, 7,143,301, and 7,024,257) and Varan (as specified by the Varan Bus User Organization). These field busses all use the Ethernet physical layer (ANSI X3.263: 1995 TP-PMD and section 25.2 of IEEE802.3-2002). These field busses are well-known in the art and will not be described in further detail. Although the following discussion focuses on EtherCAT, the present invention can be implemented with any other type of field bus.

FIG. 1 is a block diagram of a conventional master-slave arrangement. As illustrated in FIG. 1, a master device 100 is connected to a first slave device 110 via cable 103, which in turn is connected to an intermediate slave 120 via cable 113. Intermediate slave 120 is connected by cable 123 to final slave 130. The cables 103, 113, and 123 can be conventional Ethernet cables, which carry the field bus packets. As illustrated in FIG. 1, each slave has two full-duplex, bi-directional, field bus ports designated X and Y. Thus, the master 100 is connected to the X port 111 of the first slave 110 and the Y port 112 of the first slave 110 is wired to the X port 121 of the second slave 120 and so on until the last slave of the network 130, where X port 131 is connected to the final slave 130, but the Y port 132 of the final slave is unused. For ease of understanding, and not for purposes of limitation, FIG. 1 and subsequent figures illustrate only a first slave, intermediate slave and final slave. One skilled in the art, however, would recognize that such field bus arrangements can include more than one intermediate slave, in which case the operation of further intermediate slave devices would be the same as the disclosed intermediate slave.

During their service life and especially during commissioning, field bus slave devices typically require programming while connected in a network, which is achieved using a device known in the art as a configurator. FIG. 2 is a block diagram illustrating a conventional arrangement for programming field bus slave devices using a configurator. Specifically, each slave device includes an auxiliary port 211, 221, 231, which can be coupled to an Ethernet switch 250. Configurator 240 is also coupled to the Ethernet switch 250, which allows configurator 240 to program slave devices 110, 120 and 130 using TCP/IP formatted packets. This arrangement provides a separate and distinct physical transmission path for configuration programming from the field bus data, which is important given that the field bus data is formatted with a protocol that is time-sensitive.

FIG. 3 is a block diagram illustrating the some of the internal components of a conventional first, intermediate or final field bus slave device. As illustrated in FIG. 3, the X port 111, 121, 131, Y port 112, 122, 132 and auxiliary port 211, 221, 231 have a similar structure, including a physical connector, a pair of transformers and a PHY device, which is a transmitter and receiver circuit. Field bus logic module 311 is coupled to the X port 111, 121, 131 and Y port 112, 122, 132 in order to interact with field bus packets, which includes reception, transmission and modification (if necessary) of field bus packets. The field bus logic module 311 is typically implemented as field programmable gate array (FPGA) or an application specific integrated circuit (ASIC). For ease of explanation, and not limitation, the following discussion will refer simply to an FPGA. However, an ASIC can be used as an alternative. FIG. 3 also shows the auxiliary port 211, 221, 231 which allows TCP/IP communication with microcontroller 312. In this case, the microcontroller itself has a built-in Ethernet MAC. The auxiliary port is essential for connecting the configurator in the manner of FIG. 2, however it will be omitted from all further figures as this invention renders the auxiliary port unnecessary.

The overall operation of the slave is typically controlled by microcontroller 312, which is coupled via processor bus 313 to field bus logic module 311. It should be recognized that the microcontroller 312 can be a microprocessor, a digital signal processor or similar device, any of which may be integrated into the same FPGA or ASIC as the field bus logic module 311. Processor bus 313 can be a conventional parallel processor bus or a serial connection such as SPI, so that microcontroller 312 can respond to commands transmitted via the field bus. For ease of explanation, the sensor/actuator aspects of the slave device have been omitted as the invention is not concerned with these aspects.

FIG. 4 is a block diagram of some of the internal components of a conventional first or intermediate slave device handling field bus packets. In the case of EtherCAT, field bus packets arriving at X port 111, 121 pass into the field bus logic module 311, where the packets are modified (if required) or otherwise acted upon and then pass out to the next downstream slave device via Y port 112, 122. Conversely, packets arriving from a downstream slave device at Y port 112, 122 are the forwarded to X port 111, 121 via field bus logic module 311.

It should be recognized that other field busses behave slightly differently. For example, SynqNet also allows a slave to originate packets that are normally sent via the X port. The variations in the operation of the field bus logic module 311 do not affect the essential operation of the present invention.

FIG. 5 is a block diagram of some of the internal components of a conventional final slave device handling field bus packets. As is evident from FIG. 1, the final slave device, unlike other slave devices, does not have a downstream slave device connected on its Y port 132. Accordingly, field bus logic module 311 in the final slave 130 is able to detect, using the link or activity signals from the PHY in the Y Port 132, that there is nothing attached to its Y port 132, and the final slave 130 puts itself into loop-back mode. In this mode, packets that would otherwise be transmitted via the Y port 132 to a downstream slave are instead returned to the master via the X port 131 of the final slave. Accordingly, as illustrated by the dashed representation of Y port 132 in FIG. 5, if the slave is at the end of the chain then the Y port 132 is unused.

Thus, as illustrated in FIG. 6, where the field bus nodes are connected in a line, the Y port 132 of the final slave 130 is deactivated.

SUMMARY OF THE INVENTION

Because the physical connection for the field busses use the same type of physical connection as standard Ethernet, one may consider using the Y port of the final slave device as a connection point for a configurator to avoid providing an additional auxiliary port for this purpose. Although this would appear to be a simple solution, it is not by itself sufficient to establish TCP/IP communication between the configurator and the slave devices. Specifically, in the case of EtherCAT, when a configurator is connected to the Y port of final slave 130 before the master has initialized the field bus, then field bus initialization will fail because the configurator is not a field bus slave device and will not give the correct responses during initialization. If, however, the configurator is connected after the master has initialized the field bus network, then the field bus will continue to function. However, the configurator cannot communicate with final slave 130 because the Y port of final slave 130 is inactive. Under these circumstances other field busses may behave differently, and may, for example, cease to function altogether.

Accordingly, there are a number of problems that would be encountered when trying to use the Y port of the final slave. The first problem, therefore, is how to activate the Y port of the final slave for TCP/IP communications when the configurator is attached, before or after the field bus has been initialized. This action must take place without disturbing the field bus in any way, that is to say that from the perspective of the field bus the Y port of the final slave appears to remain unconnected.

A second problem concerns the potential collision of the TCP/IP configuration packets with the field bus packets. As discussed above, field bus communications, to which the present invention is directed, have strict timing requirements and a reply packet is expected to appear a very short time after the poll request packet from the master. If no reply packet is received, the reply packet is received late, or the reply packet is corrupted, then the master treats this as an error and, after some number of such errors has been detected, the master will suspend field bus communications. In contrast, the TCP/IP protocol for configuring the slave devices uses a confirmed service, such as Telnet, that has less stringent timing requirements, and has the ability to tolerate dropped or corrupted packets by re-sending packets when required. Therefore, if TCP/IP packets can arranged to be sent during time slots when no field bus packets are being sent, then the timing requirements of the field bus will not inhibit correct operation of TCP/IP.

A third, related problem concerns arranging for the TCP/IP packets to be sent during dead time on the field bus. The flow of field bus packets may be organized on a cyclic schedule with several packets being transmitted in succession following a time when field bus communications are quiet.

A fourth problem is to avoid disturbing the network devices by having two network protocols running on the same cabling. The hardware and software in each slave device used in the field bus communication must ignore the TCP/IP packets, and conversely the hardware and software in each slave device used in TCP/IP communication must ignore the field bus packets. Likewise, the master must not be disturbed by receiving TCP/IP packets and the configurator must not be disturbed by receiving field bus packets.

A fifth problem is to arrange for TCP/IP packets from the configurator to reach other slave devices. For example, to communicate with the first slave 110, the packets from configurator must pass through final slave 130 and then intermediate slave 120. Similarly, the reply packet from the first slave 110 must pass through intermediate slave 120 and then final slave 130 before reaching the configurator. In normal operation the field bus hardware will block the passage of non-field bus packets.

A sixth problem is for each slave to activate TCP/IP communication with the configurator. The standard method involves monitoring the Y network port and starting the software process of acquiring a TCP/IP address when it is recognized that a cable has been plugged in as result of the receipt of symbols by the Y port PHY. The standard technique is only usable in the final slave device in the network because all other nodes receive symbols on their Y ports as a result of field bus activity.

Exemplary embodiments of the present invention address one or more of the above-identified problems. Specifically, exemplary embodiments of the present invention provide systems and methods of supporting communications over a common network connection in a master-slave field bus network with a first type of packet formatted with a time-sensitive protocol and a second type of packet formatted with a non-time-sensitive protocol. The slave devices are configured with filters to prevent the first type of packet from reaching a configurator and the second type from reaching a master device. The slave devices are also configured with arbitration logic so that the packets formatted with the time-sensitive protocol are provided with a priority over the packets formatted with the non-time-sensitive protocol. This allows a configurator to be coupled to the network to program the slave devices without interfering with the field bus communications.

The packet filtering can be based on a field within the header of the packets, such as the Ethertype field, or within the data payload, or can be based on values of the preamble of the packets. In this latter case, the slave device to which the configurator is connected can be configured to modify the preamble of packets received from the configurator so as to identify the packets as non-time-sensitive packets to other slave devices in the network and to un-modify packets received from the other slave devices so that the packets are properly formatted for the configurator.

Other objects, advantages and novel features of the present invention will become apparent from the following detailed description of the invention when considered in conjunction with the accompanying drawings.

BRIEF DESCRIPTION OF THE DRAWING FIGURES

FIGS. 15, 16a and 16b are block diagrams of exemplary master-slave with configurator arrangements in accordance with a second embodiment of the present invention;

DETAILED DESCRIPTION OF THE PREFERRED EMBODIMENTS

Prior to addressing the present invention in detail, a brief overview of Ethernet network hardware is provided to assist in the understanding of the invention. As discussed above, the PHY device in each X port and Y port contains a transmitter and a receiver. PHYs are complex devices and can inform attached circuitry of certain conditions pertaining to the attached network cable. In particular, a "link" indication is provided when a cable is attached and symbols are being received, and an "activity" indication is provided when packets are being received. If there is more than one active source of packets to be transmitted, then the transmitter portion of the PHY must be preceded by an arbiter. An arbiter is a combination of a multiplexor that gates the selected source of packets to the PHY and of arbitration logic that selects the source. The packets are conveyed to the arbiter via buffers, and each source of packets has an associated buffer. The depth of the buffers is chosen so that when a packet is being forwarded from one buffer, packets can be stored temporarily in the other buffers. A buffer is typically implemented as memory block with two associated pointer registers to point to the head and tail of the data. The head pointer is decremented when data is transmitted and the tail pointer is incremented when data is added.

Figure 13:
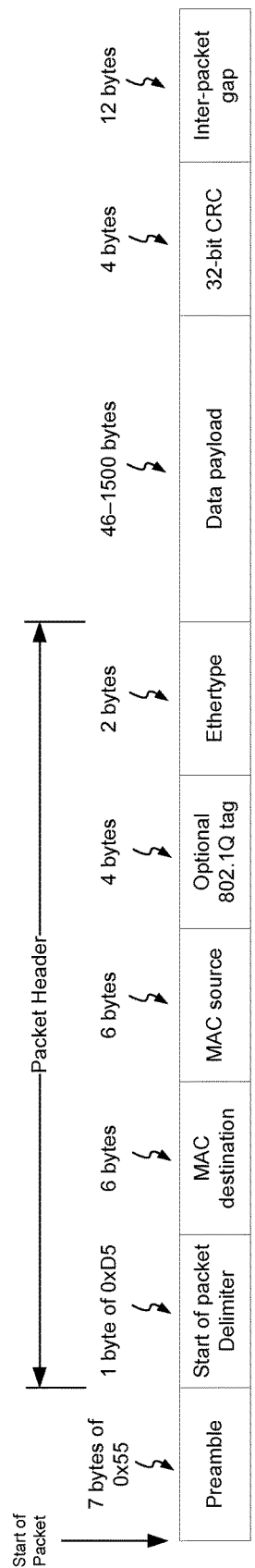
FIG. 13 is a block diagram of an Ethernet packet in accordance with the present invention.

The buffers interact with the arbiter using logic signals from each buffer to indicate when each respective buffer has data that is ready to be sent. Specifically, the arbitration logic sends a signal to one buffer requesting that buffer to transmit its data and to all of the other buffers to continue to accumulate data. The arbitration logic typically sends data from each buffer in turn, skipping those buffers that have no data to send—this system is known as "round-robin" arbitration, which is a simple fair access algorithm. When the arbiter has finished transmitting a packet from one buffer it pauses for a short time before transmitting a packet from the next buffer. The pause causes idle symbols to be transmitted so that the inter-packet gap is enforced (as shown in FIG. 13), which is required to ensure correct operation of the PHY devices. For ease of understanding, and not limitation, exemplary embodiments of the present invention are illustrated and described without reference to the logic control signals between the arbiters and the buffers and many other necessary elements, such as logic clocks and power supplies. These are standard components that one skilled in the art would understand how to implement with the present invention.

Figure 7:
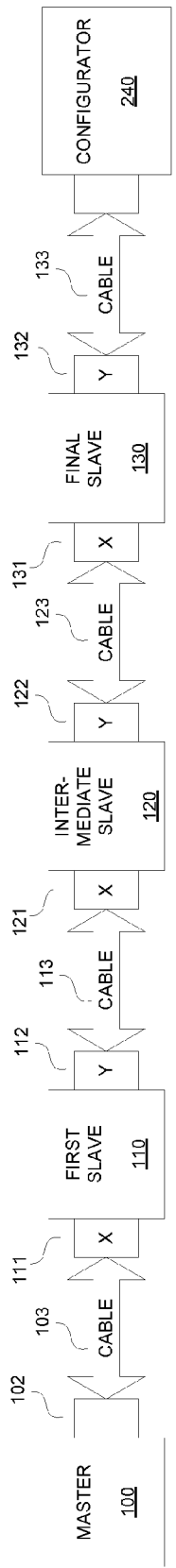
FIG. 7 is a block diagram of an exemplary master-slave with configurator arrangement in accordance with a first embodiment of the present invention.

Turning now to FIG. 7, exemplary embodiments of the present invention provide slave devices that are configured in such a manner that a configurator 240 can be coupled to the conventionally unused Y port 132 of the final slave device 130 via cable 133. This is achieved by configuring the first, intermediate or final slave devices in the manner illustrated in FIG. 8. As described above, first it is necessary to activate the slave devices for TCP/IP communications. To activate the slave device for TCP/IP communications, switch 812 is used to activate the Y port for TCP/IP communication with a configurator, and also to set the operational modes of certain logic modules, particularly 804, 803, 809, 810, 811 as will be described below. When a configurator is attached to the Y port 132 of the final slave 130, then switch 812 should be set to assert the ACTIVATE_BACK_DOOR signal 819. The ACTIVATE_BACK_DOOR signal 819 is routed to the field bus logic module 311 by way of a connection that is not illustrated in FIG. 8. This signal causes the field bus logic module 311 to over-ride the link and activity indications from the PHY in the Y port 132, thus mimicking the condition where nothing is attached to Y port 132, which in turn causes field bus logic module to loop-back. Thus, switch 812 activates back door communication in the final slave 130, but not in the first or intermediate slave devices 110, 120. In other words, in the first and intermediate slave devices switch 812 is maintained in a position so that the ACTIVATE_BACK_DOOR signal 819 is not asserted.

Like the final slave device, the first and intermediate slave devices must be activated for TCP/IP communication in order to begin the process of acquiring an IP address. The configuration of the first and intermediate slave devices are activated for TCP/IP communication in a different manner than that of the final slave device. The standard technique in a normal TCP/IP network is for a node to monitor the network PHY (transceiver) and acquire an IP address based on the start of network activity at said PHY, for example when a cable is plugged in. The final slave 130, as configured by switch 812, uses this standard technique in conjunction with the Y port PHY. The first and intermediate slave devices 110, 120, however, always see network activity on their Y port PHYs at all times as a result of field bus activity. Accordingly, the standard technique cannot be used by the first and intermediate slave devices. Instead, each slave has a TCP/IP Wake-up Module 811 which inspects the incoming packet on each slave's Y port.

The inspection by TCP/IP Wake-up Module 811 can use either one of two alternative algorithms. In the first algorithm, the module 811 looks for a TCP/IP packet (as distinct from a field bus packet), and when one has been detected the WAKEN signal 815 is asserted to the microcontroller. If no TCP/IP packets have been received within a certain time interval (on the order of a hundred milliseconds) then the WAKEN signal 815 is de-asserted.

In the second algorithm, the final slave 130 at the end of the network, as determined by the signal ACTIVATE_BACK_DOOR 819 being true, periodically sends a special wake-up packet upstream from logic module 814 when its Y port PHY detects network activity. The TCP/IP Wake-up Module 811 in the first and intermediate slave devices detects this special wake-up packet and activate their respective WAKEN signals 815 to the microcontrollers. If no special wake-up packets have been received within a certain time interval (on the order of a hundred milliseconds) then logic module 811 de-activates the WAKEN signal 815. Compared to the first algorithm, the second algorithm employs shorter packets, which lowers the loading on the network, and fewer logic gates are required to implement the second algorithm. The special wake-up packet has the following properties: it is neither a field bus packet nor a normal TCP/IP packet and will be ignored by the master. A pre-defined but very short packet is a suitable special wake-up packet as it can easily be recognized and, if necessary, filtered. This wake-up packet is a particular example of what those skilled in the art will term as a 'runt packet'.

In all intermediate and final slave devices, logic module 814 attempts to send the special wake-up packet via the X port on a periodic basis, for example every 100 ms. Arbiter 800 may defer transmission in the event that packet transmission is in progress from buffer 813 or buffer 802.

If signal ACTIVATE_BACK_DOOR 819 is false then logic module 811 monitors the Y port for wake-up packets. When logic module 811 detects a wake-up packet, then WAKEN_Y signal 815 is asserted or re-asserted to the true state for 200 ms. Thus, in the first slave 110 and intermediate slave 120 WAKEN_Y signal 815 is held in the true state if a wake-up packet is received on the Y port at least once per 200 ms.

If signal ACTIVATE_BACK_DOOR 819 is true then logic module 811 asserts WAKENY_Y signal 815 for 200 ms when the PHY at the Y port detects network activity. Logic module 811 sets WAKENY_Y signal 815 false after 200 ms of inactivity at the Y port detects network activity. Thus, the final slave 130 WAKEN_Y signal 815 is held in the true state if any packet is received on the Y port at least once per 200 ms.

Now that the activation of the slave devices for TCP/IP communications has been described, the routing of field bus and TCP/IP packets by slave devices will be described in connection with FIGS. 9-20.

Figure 5:
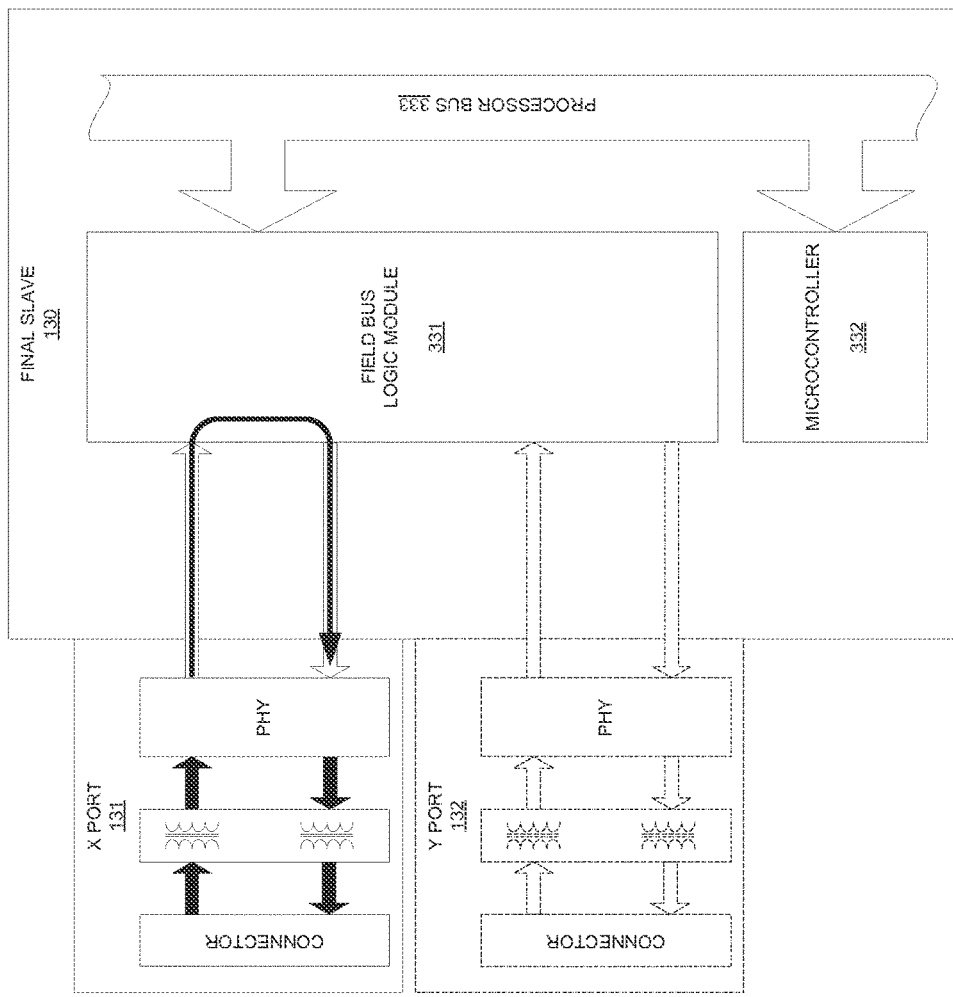
FIG. 5 is a block diagram of some of the internal components of a conventional final slave device handling field bus packets.
Figure 6:
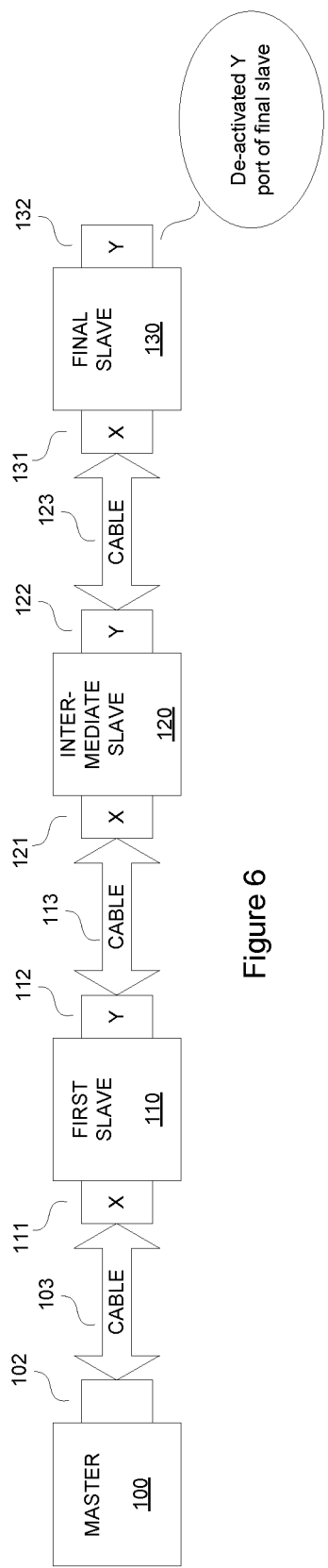
FIG. 6 is a block diagram of a conventional master-slave arrangement.
Figure 9:
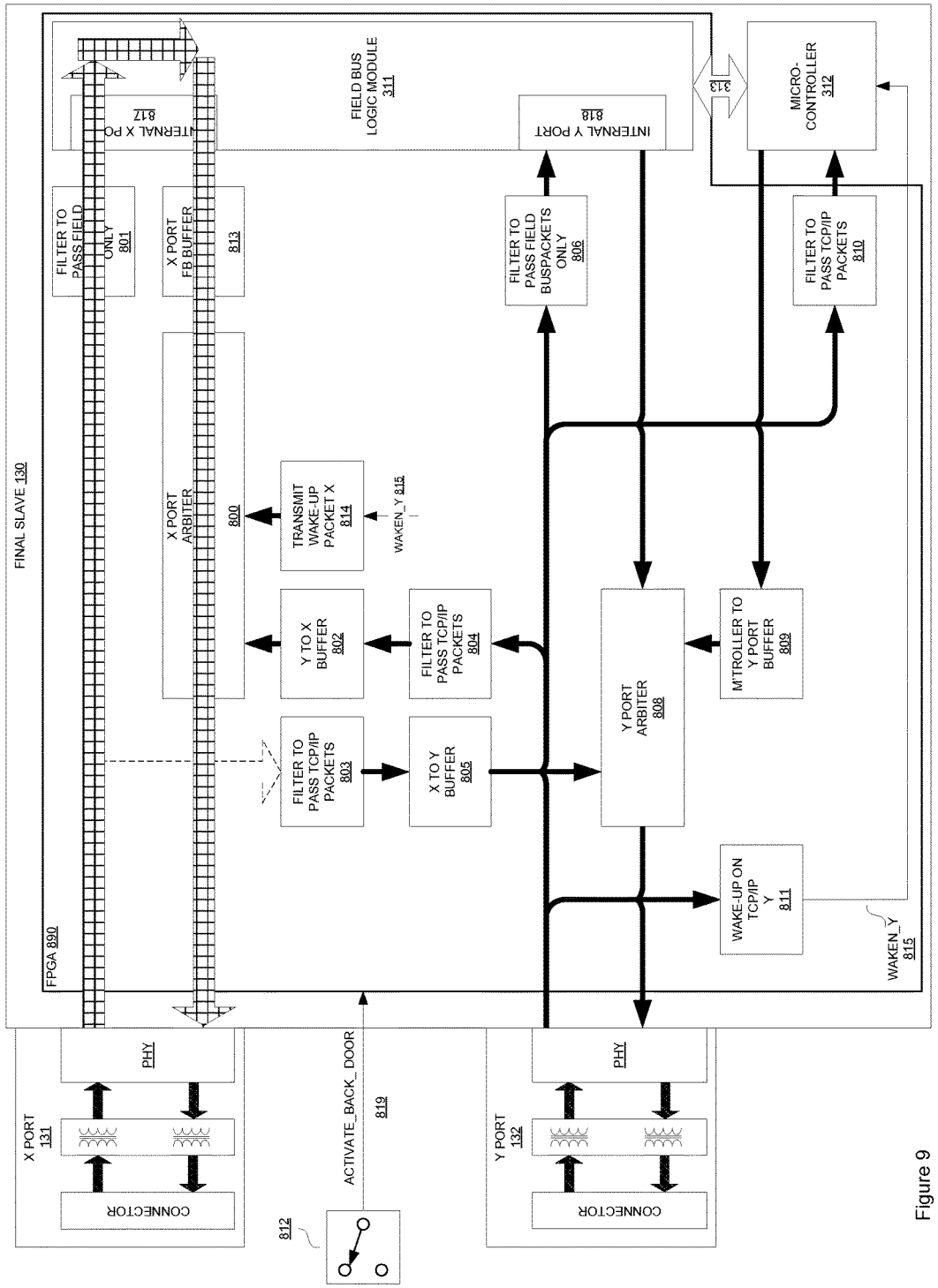
FIG. 9 is a block diagram of some of the internal components of an exemplary final slave device showing the flow of field bus packets in accordance with the first embodiment of the present invention.

FIG. 9 is a block diagram of an exemplary final slave device handling field bus packets in accordance with the first embodiment of the present invention. Even though switch 812 is set to assert the ACTIVATE_BACK_DOOR signal 819, the field bus logic mimics the condition when nothing is attached to Y port 132, causing field bus logic module 311 to loop-back the field bus packets. As can be seen by comparing the arrangements in FIGS. 5 and 9, the path of the field bus packets within the final slave device is essentially unchanged, except that the final slave device of the present invention also passes the field bus packets through two additional logic modules 800 and 813 in the return path. Specifically, the field bus packets received on X port 131 pass through filter 801, internal X port 817, buffer 813, and arbiter 800 so that the field bus packets loop-back.

Figure 10:
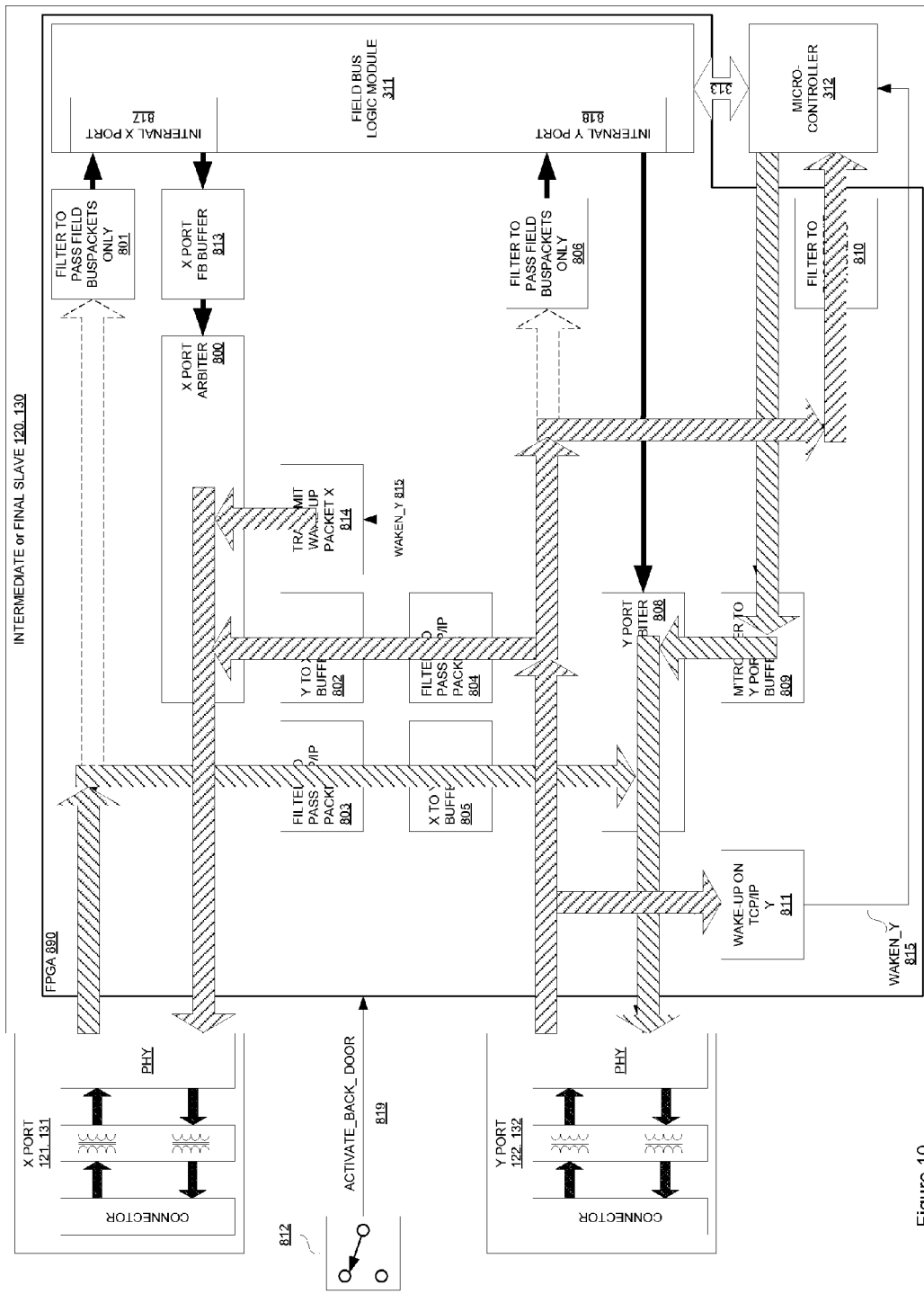
FIG. 10 is a block diagram of some of the internal components of an exemplary intermediate or final slave device showing the flow of TCP/IP packets accordance with the first embodiment of the present invention.

FIG. 10 is a block diagram of an exemplary final or intermediate slave device handling TCP/IP packets accordance with the first embodiment of the present invention. The microcontroller 312 has an integrated Ethernet MAC and is able to receive TCP/IP packets received from the Y port 122, 132 via filter 810 and to transmit TCP/IP packets to the Y port 132 via buffer 809 and arbiter 808. All packets received on Y port 122, 132 are passed to modules 804, 806, 810 and 811. If the packet is a TCP/IP packet it is forwarded by filter 804 to buffer 802 and then to the X port 121, 131 via arbiter 800: this is the only path by which TCP/IP packets flow from Y port to X port. Packets presented to filter 810 are forwarded to microcontroller 312 only if they are TCP/IP packets. Packets presented to module 811 assert or re-assert signal WAKEN_Y_815 only if they are TCP/IP packets. TCP/IP packets presented to filter 806 are blocked.

All packets received on X port 121, 131 are passed to modules 801 and 803. TCP/IP packets presented to filter 801 are blocked. Packets presented to filter 803 are forwarded only if they are TCP/IP packets, they then proceed to buffer 805 and via arbiter 808 to Y port 122, 123; this is the only path by which TCP/IP packets can pass from the X port to the Y port. Microcontroller 312 sends TCP/IP packets only, which pass via buffer 809 and arbiter 808 to the Y port 122, 132. Thus, TCP/IP packets pass from the X port to the Y port and from Y port to X port, in both cases the TCP/IP packets by-pass the field bus logic module 311. It should be noted that only TCP/IP packets received from a downstream device, namely the device connected to the Y port, are passed to microcontroller 312 because these packets include the programming from the configurator, whereas the TCP/IP packets received from upstream slave devices are intended only for the configurator, similarly TCP/IP packets from the microcontroller pass downstream via the Y port only. As illustrated in FIG. 10, filters 801 and 806 prevent the TCP/IP packets received by X port 121, 131 or Y port 122, 132 from reaching the field bus logic module 311.

Filters 801 and 806 could be incorporated into field bus logic module 311 because this module will in any case have to inspect the Ethertype field of the packet, as shown in FIG. 13, and can reject non field bus packets at that instant. Incorporating the filters into the field bus logic module 311 in this way uses logic gates very efficiently. If the field bus logic module 311 is supplied to the designer of the FPGA 890 by a third party as an encrypted IP core, that is to say as a 'black box', then the designer has no choice but to implement the design using orthodox filtering, namely by examining the Ethertype field, in filters 801 and 806, which will be described in more detail below.

Although filter 810 is illustrated as being implemented as FPGA logic gates, the microcontroller 312 could alternatively receive all packets and use software to filter the field bus packets. However, in most cases, this will be impracticable because of the processing burden that this would impose. Moreover, if the field bus communications use TCP/IP as part of its protocol then filter 810 is essential because the object of the invention is to establish communication between the configurator 240 and the microcontroller 312 and not between the master 100 and the microcontroller 312. In this case, accelerated filtering, which will be described in more detail below, must be used as this can distinguish packets from the configurator 240 versus packets from the master 100 directly.

Figure 1:
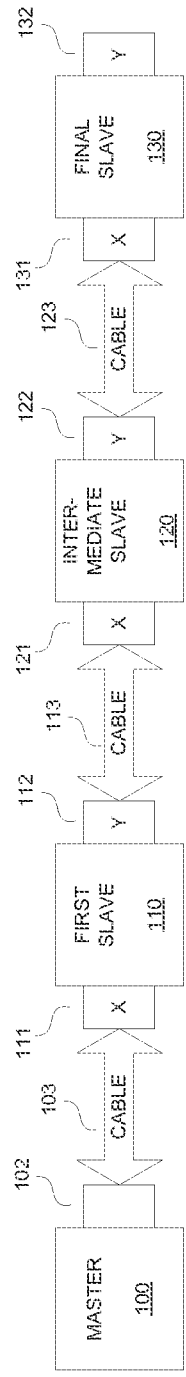
FIG. 1 is a block diagram of a conventional master-slave field bus arrangement.
Figure 2:
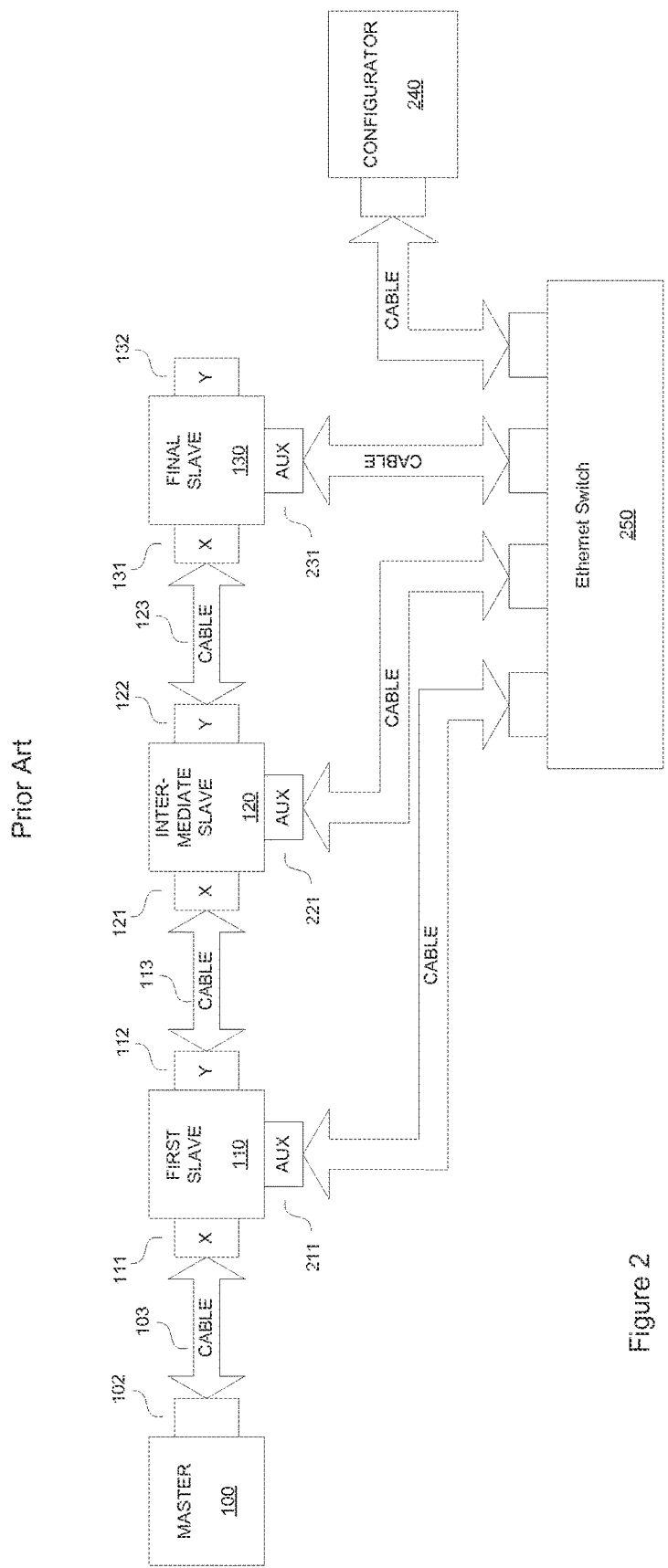
FIG. 2 is a block diagram of a conventional arrangement for programming slave devices.
Figure 3:
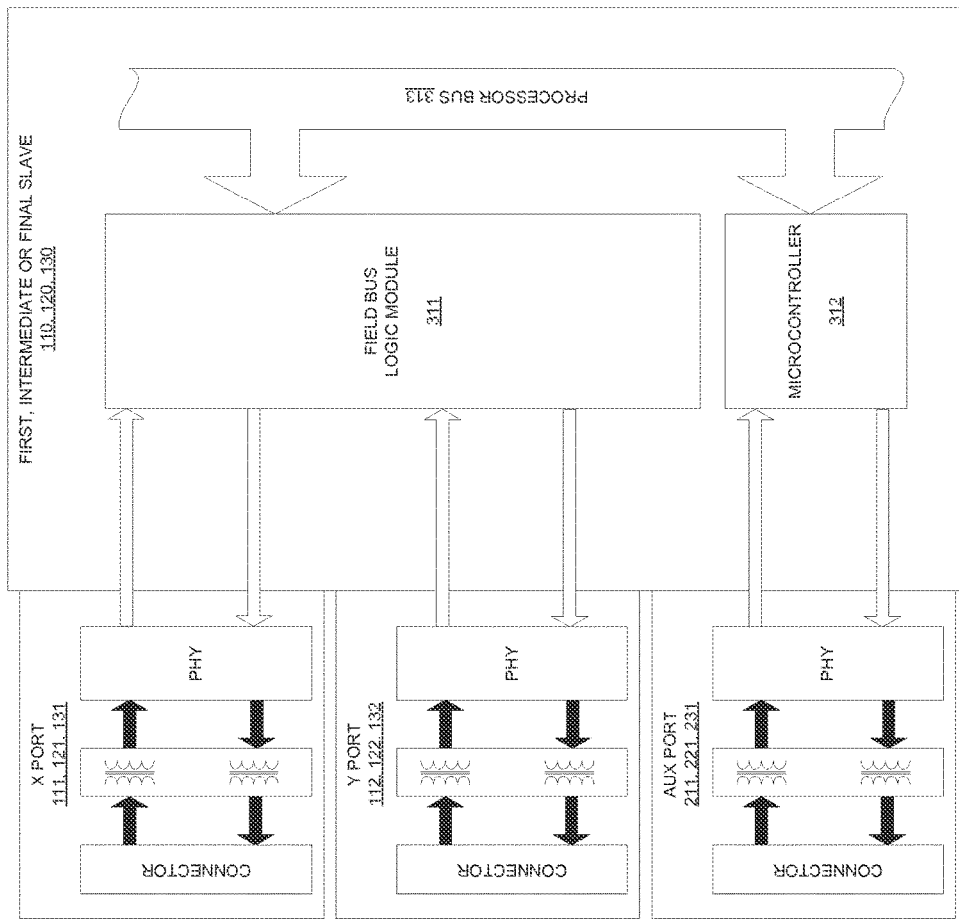
FIG. 3 is a block diagram of some of the internal components of a conventional first, intermediate or final slave device.
Figure 4:
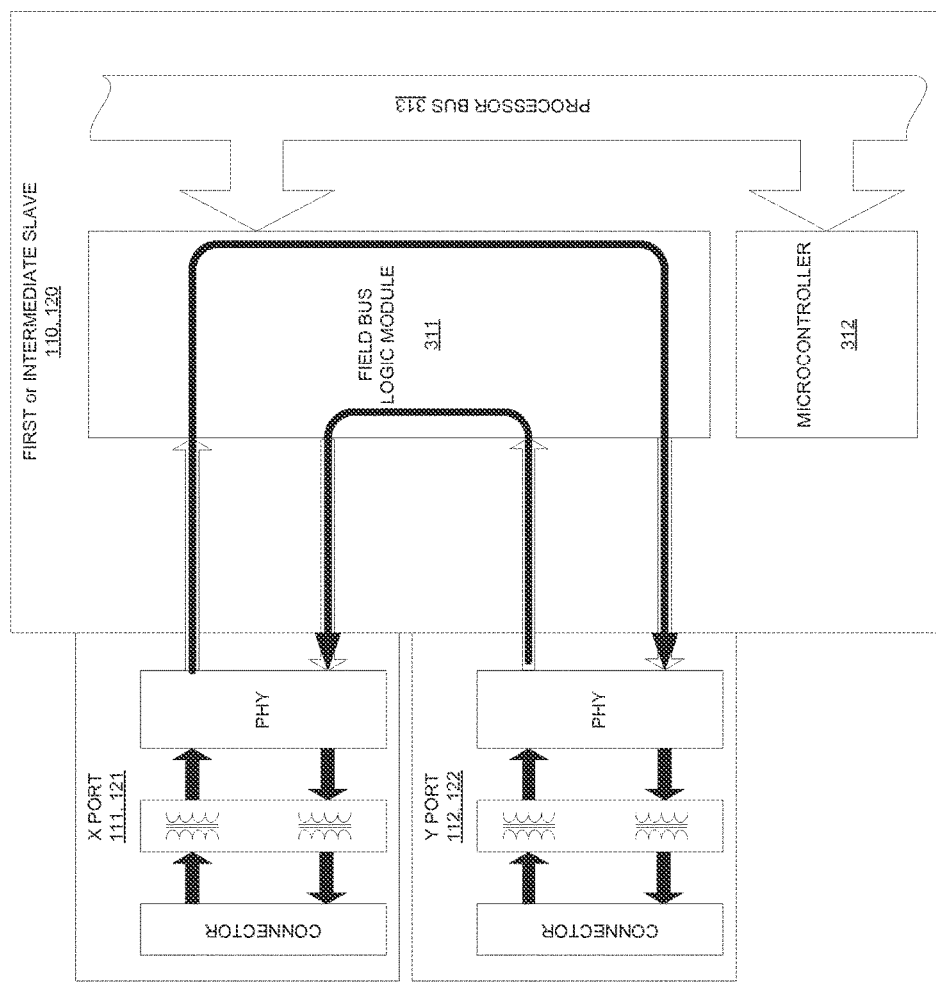
FIG. 4 is a block diagram of some of the internal components of a conventional first or intermediate slave device handling field bus packets.
Figure 11:
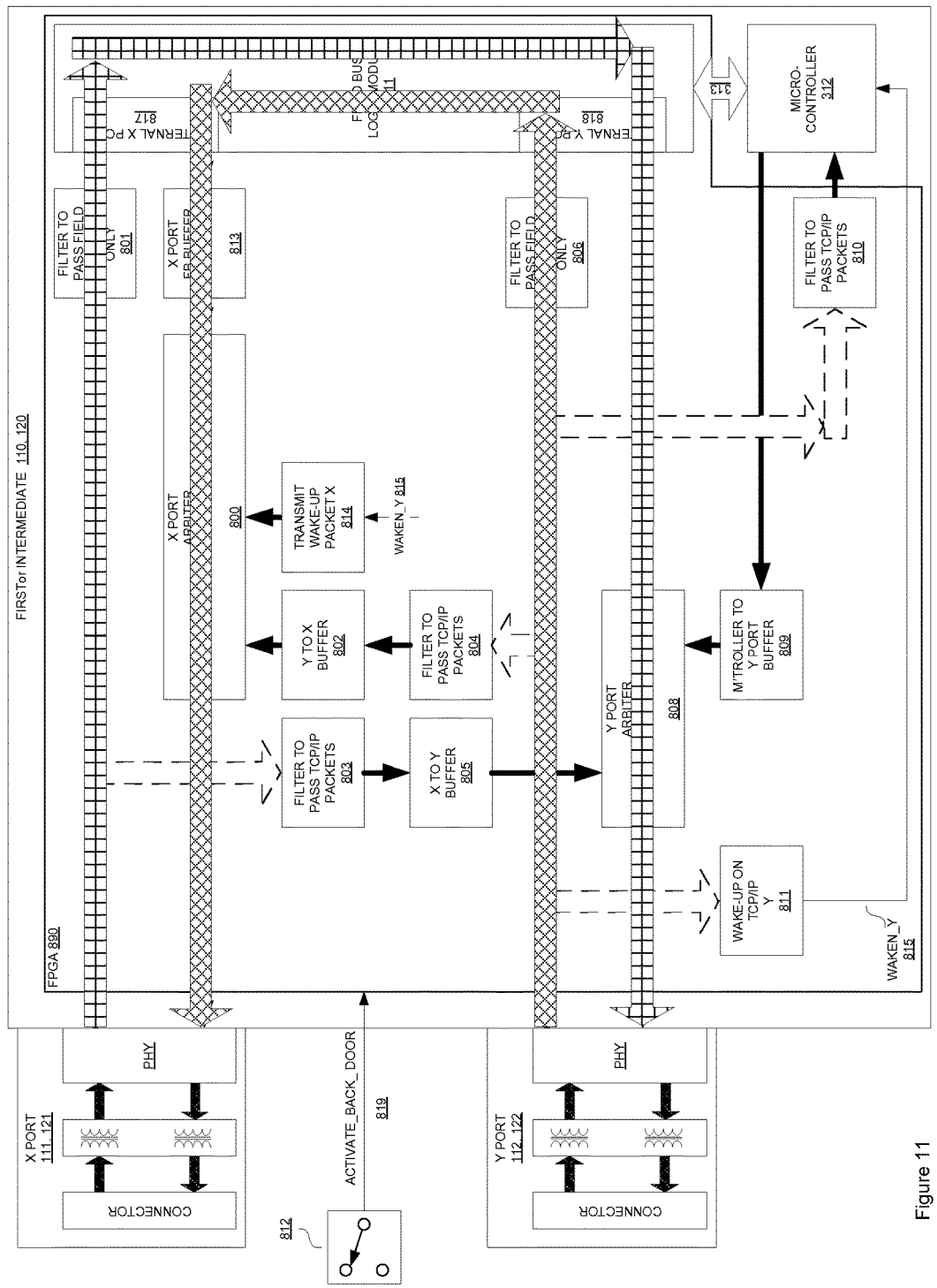
FIG. 11 is a block diagram of some of the internal components of an exemplary first or intermediate slave device showing the flow of field bus packets in accordance with the first embodiment of the present invention.

FIG. 11 is a block diagram of an exemplary first or intermediate slave device handling field bus packets in accordance with the first embodiment of the present invention. As can be seen by comparing FIGS. 4 and 11, the paths of the field bus packets are essentially unchanged. The difference is that in the arrangement of FIG. 11 field bus packets received on Y port 112, 122 now also flow to three further logic modules 804, 810 and 811. Filter 804 prevents the upstream field bus packets from by-passing the field bus logic module 311 so that these pass through internal Y port 818 of field bus logic module 311. These packets are then passed to internal X port 817, buffer 813 and arbiter 800, to arrive at X port 111, 121. Filter 810 blocks the passage of field bus packets to microcontroller 312. The field bus packets arriving at logic 811 are ignored because these packets are not TCP/IP wake-up packets. Similarly, field bus packets received on X port 111, 121 now also flow to filter 803, which prevents the field bus packets from by-passing the field bus logic module 311. Instead, the field bus packets received on X port 111 are passed to filter 801, internal X port 817, field bus module 311, internal Y port 818 and arbiter 808 to arrive at Y port 112, 122.

Figure 12:
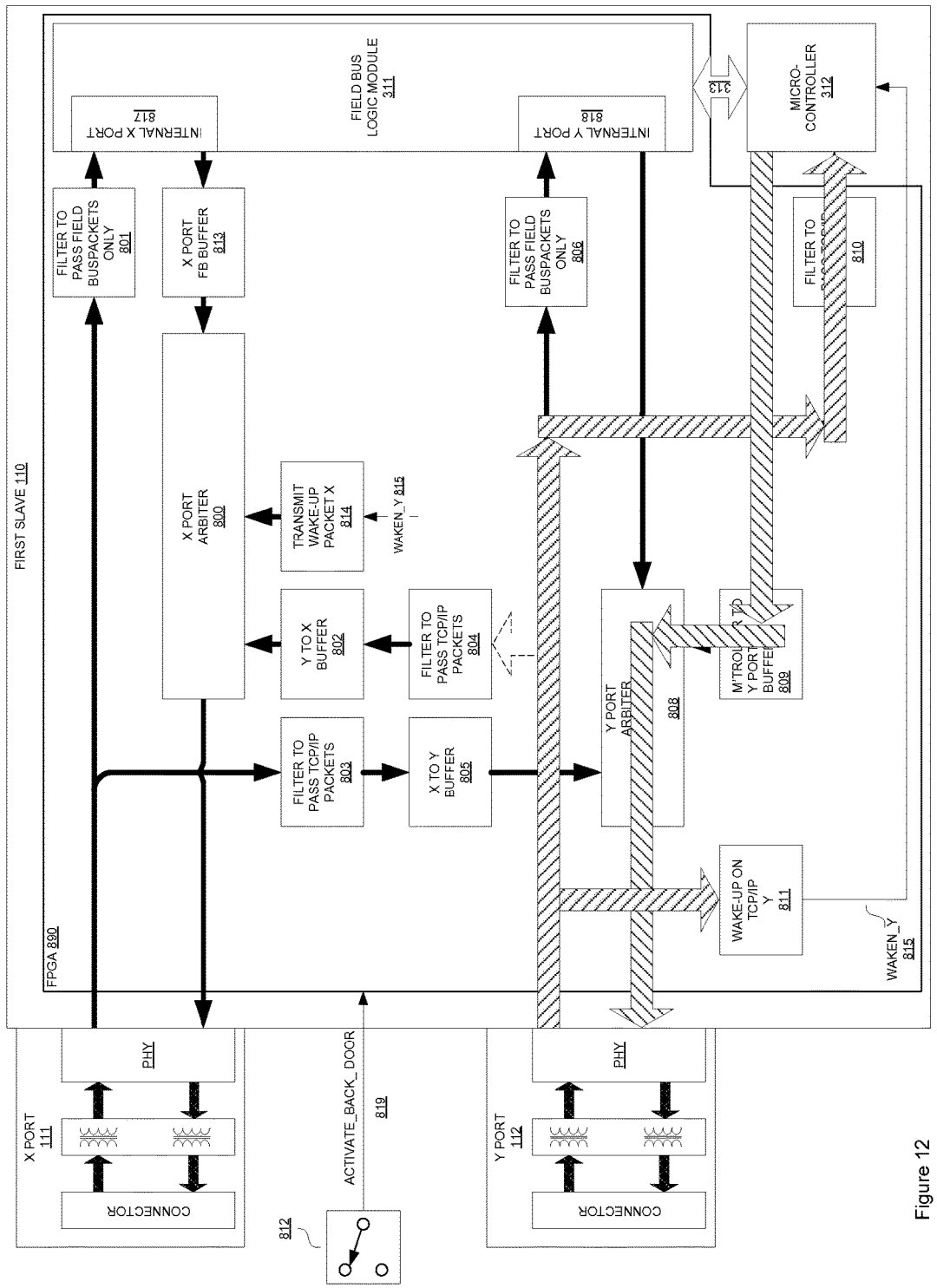
FIG. 12 is a block diagram of some of the internal components of an exemplary first slave device showing the flow of TCP/IP packets accordance with the first embodiment of the present invention.

FIG. 12 is a block diagram of an exemplary first slave device handling TCP/IP packets accordance with the first embodiment of the present invention. FIG. 12 is similar to FIG. 10 except that there are no TCP/IP packets received at the X port. Specifically, TCP/IP packets received on Y port 112 are passed to microcontroller 312 via filter 810. Microcontroller 312 can transmit packets to Y port 112 via buffer 809.

By means of a non-volatile memory local to the slave device (not illustrated in FIG. 12) filter 804 is configured to block the TCP/IP packets. This prevents master 100 from receiving any packets originating from the configurator 240. Additionally, logic module 814 is configured to not send wake-up packets to X port 111 so that these packets are not transmitted to master 100. Configuring logic modules 804 and 814 in this way ensures that only field bus packets are transmitted via the X port to the master 100. These steps are not required in all cases, as most master devices will ignore packets that are not field bus packets. As also illustrated in FIG. 12, the microcontroller 312 receives TCP/IP packets from the Y port only and can transmit TCP/IP packets to the Y port only.

Thus, it can be seen that at every slave the respective microcontroller will receive all of the TCP/IP packets transmitted by the configurator 240, and that the TCP/IP packets sent by any of said microcontrollers will reach the configurator. Likewise, the respective microcontroller 312 at every slave node will participate in TCP/IP communications in response to TCP/IP packets being received at the Y port. It will also be seen that the field bus logic module 311 in each slave does not receive TCP/IP packets, and master 100 does not receive TCP/IP packets.

FIGS. 8-12 illustrate five packet filters 801, 803, 804, 806, 810, which can implement one of two filtering schemes:

orthodox and accelerated. The orthodox filtering scheme operates by examining the content of the packet. Specifically, referring now to FIG. 13, exemplary embodiments of the present invention distinguish field bus packets from TCP/IP packets by inspecting, for example, the Ethertype field in the header. This field is set to 0x0800 for TCP/IP v4, whereas field busses use other values in this field, for example in the case of EtherCAT, Ethertype is set to 0x88A4. Alternatively, the filtering can be based on information in the data payload of the packet. In the orthodox filtering scheme, filters 801, 803, 804, 806, 810 operate by buffering enough of the incoming packet to inspect the Ethertype field and then discarding the packet if it is not of the type specified for pass-through. Specifically, filters 801 and 806 filter TCP/IP packets and pass field bus packets, and filters 803, 804 and 810 filter field bus packets and pass TCP/IP packets.

Packet filter 804 has the additional function of blocking the flow of TCP/IP packets to the master 100, this feature is activated only in the first slave 110, which is the slave nearest to the master. The blocked flow is shown in FIG. 12. In a practical implementation, the slave devices will have local, non-volatile memory such as an EEPROM or FRAM (not shown in FIG. 8 et seq.), which is configured by the configurator so that packet filter 804 blocks all packets. Blocking the flow of TCP/IP packets to the master 100 ensures that the master is not confused by receiving packets that are not field bus packets.

As discussed above, the field bus communications have strict timing requirements, whereas TCP/IP has looser timing requirements. Thus, it is necessary to prevent the TCP/IP packets from colliding with the field bus packets. Therefore, in accordance with the present invention, TCP/IP traffic can yield to the field bus packets, which is achieved using arbiters 800 and 808, and buffers 802, 805, 809, 813 and 814.

Arbiter 800 is a device that at a given instant, forwards a packet received from one of two buffers 802 and 813. If the two sources are attempting to transmit simultaneously then buffer 813 takes precedence and buffer 802 is instructed (control signals not shown for the sake of simplicity) to buffer the data and thus defer transmission from 802.

Buffer 813 is very short and its main purpose to allow the arbiter to transmit a short sequence of idle symbols to the X port when arbiter 800 switches sources from buffer 802 to buffer 813; the sequence of idle symbols corresponding to the inter-packet gap shown in FIG. 13.

Arbiter 800 has to choose whether to send the packet from buffer 802 or buffer 813 or wake-up packet buffer 814. Arbiters are found in standard network switch hardware and it is common in data communication networks to be able to configure routers and switches to prioritize certain packets based on their type, source address or destination address to achieve Quality of Service objectives. This prioritization is based on inspecting the packet headers or content and postponing the transmission of lower priority packets by holding them in buffers. This is standard technology in managed switches and routers. However, this type of packet inspection is not possible in this invention because the inspection process would delay the field bus packet by the time taken to transmit the header plus further delays caused by the inspection processing. Moreover, these delays would accumulate with each slave device and would eventually cause a field bus communication timing violation. Instead of using packet inspection, the present invention uses the arbiters to provide the field bus packet priority by being triggered by the start of stream delimiter of any packet sent by the field bus logic module. As soon as the arbiter receives a packet from the field bus logic module it abandons any TCP/IP packet that is in the process of being transmitted and instead transmits the field bus packet. This process, which is here termed "unconditional arbitration" incurs only a minimal delay to the field bus packet in contrast to packet inspection which requires receiving at least 224 bits before making a decision. This is quite different from the conventional packet arbitration found in standard network switches and the like, which completes transmission of a packet before yielding priority to another packet.

Arbiter 808 operates in a similar manner to that of arbiter 800. Packets originating from the field bus logic module 311 are given unconditional priority over the TCP/IP packets that come from buffer 805 or buffer 809, and any TCP/IP packet that was being transmitted is discarded. If no packet is being transmitted by the field bus logic module 311, then arbiter 808 transmits the TCP/IP packets from either buffer 805 or buffer 809 on a round-robin basis or by using another algorithm that gives equal priority to buffers 805 and 809.

Even though the arbiter gives priority to field bus packets, it must be able to preserve TCP/IP communication. There are two aspects to this problem. The first is that when a TCP/IP packet is abandoned as a result of unconditional arbitration, the microcontroller in the upstream slave devices (in the case of the X port arbiter) and in the downstream slave devices and configurator (in the case of the Y port configurator arbiter) will receive truncated packets, i.e., runt packets, which they must ignore. Ignoring runt packets is a standard feature of the TCP/IP protocol and requires no special measures. Secondly, the TCP/IP packet must be re-sent. If this were a TCP/IP only network, the standard method of achieving this would be to send an HALT symbols to the transmitting microcontroller or configurator to cause the TCP/IP firmware stack in said device to re-transmit the packet. However, this standard technique cannot be applied here as sending HALT symbols on either the X or the Y port would cause the field bus logic modules of neighboring slave devices to perceive a fault. Instead, buffers 802, 805 and 809 carry-out re-transmission of TCP/IP packets in hardware.

Buffers 802, 805 and 809 are similar in construction. Each buffer is large enough to contain at least two complete TCP/IP packets. Each buffer also has re-try logic so that when the associated arbiter stops transmitting a TCP/IP packet before reaching the end of the packet, then the buffer will attempt to re-send the same TCP/IP packet as soon as it wins arbitration. This is possible because the packet is held in memory and the head pointer can returned to the value it had before transmission started, in this way the buffer can be "re-wound". If the packet is discarded on the second attempt then the re-try logic can make further attempts. The maximum number of re-tries is, however, set to a fairly low limit, such as five, to ensure that the network is not flooded.

This technique can be modified if the field bus quiet time is known in advance or if it can be identified during operation. In these cases, the number of times that TCP/IP will have to yield to field bus packets can be reduced, possibly to zero. This information can be made known to or can be identified by the microcontroller and a timer could then be added to activate transmission of the TCP/IP packets. Scheduling TCP/IP packet in this way would, however, add significant extra complexity in comparison with the simple re-try mechanism.

The re-try mechanism is not absolutely assured of delivering TCP/IP packets because the field bus quiet time may not be long enough to transmit a full length TCP/IP packet. In such cases the configurator has the option of shortening the TCP/IP packets exchanged using one of the several mechanisms built-in to TCP/IP, such as MSS (Maximum Segment Size).

A disadvantage to the orthodox packet filtering scheme is that a long section of the packet, namely the first 224 bits, must be received before the Ethertype field can be read. The field bus packet filters 801 and 806 cannot buffer this data because to do so would add approximately 10 µs of delay per node, which would be unacceptable. Therefore, field bus pass filters 801 and 806 simply discard the remainder of the packet, thus a runt packet is propagated on the network. This would result in a runt packet being added to the network every time a TCP/IP packet passes through a slave node. This is a serious problem as these runt packets waste network bandwidth that would otherwise be available to send TCP/IP packets, and in practice using the orthodox filtering technique severely limits the number of slave nodes that can be connected in the system.

The solution to the problem of the network being clogged up with runt packets is to use an accelerated filtering technique, which exploits the preamble of the standard Ethernet packet in at least filters 803 and 804. Referring again to FIG. 13, the preamble of the standard Ethernet packet carries no useful information for modern Ethernet implementations, but is usually retained for backwards compatibility with earlier implementations of Ethernet. Therefore, the preamble can be utilized for other purposes within each slave provided that the preamble is restored to its standard content before it reaches the master 100 or the configurator 240. If the network does not use preambles then a preamble can be added. In the accelerating filtering scheme the TCP/IP packets are tagged by modifying the preamble, for example, by changing the second byte of the preamble from 0x55 to 0xAA. Subsequent packet filters need only examine the first two bytes of packet; if it is 0x55AA then it is assumed to be a TCP/IP packet and if it is anything else it is assumed to be a field bus packet. Reading the front of the preamble in this way requires only 16 bits to be buffered and requires only 160 ns, which is comparable to the delay of the cables and poses no problem to the field bus. The tagging takes place at the point where the TCP/IP packets from the configurator enter the network at the final slave 130 and also where the TCP/IP packets from each microcontroller enter the network within each slave. The tagged TCP/IP packets from the microcontrollers must be de-tagged, namely start of the preamble is restored to 0xAAAA, before passing from the final slave to the configurator. Additionally, the TCP/IP packets could be de-tagged before arriving at the master, but it is preferable to block them altogether.

Figure 8:
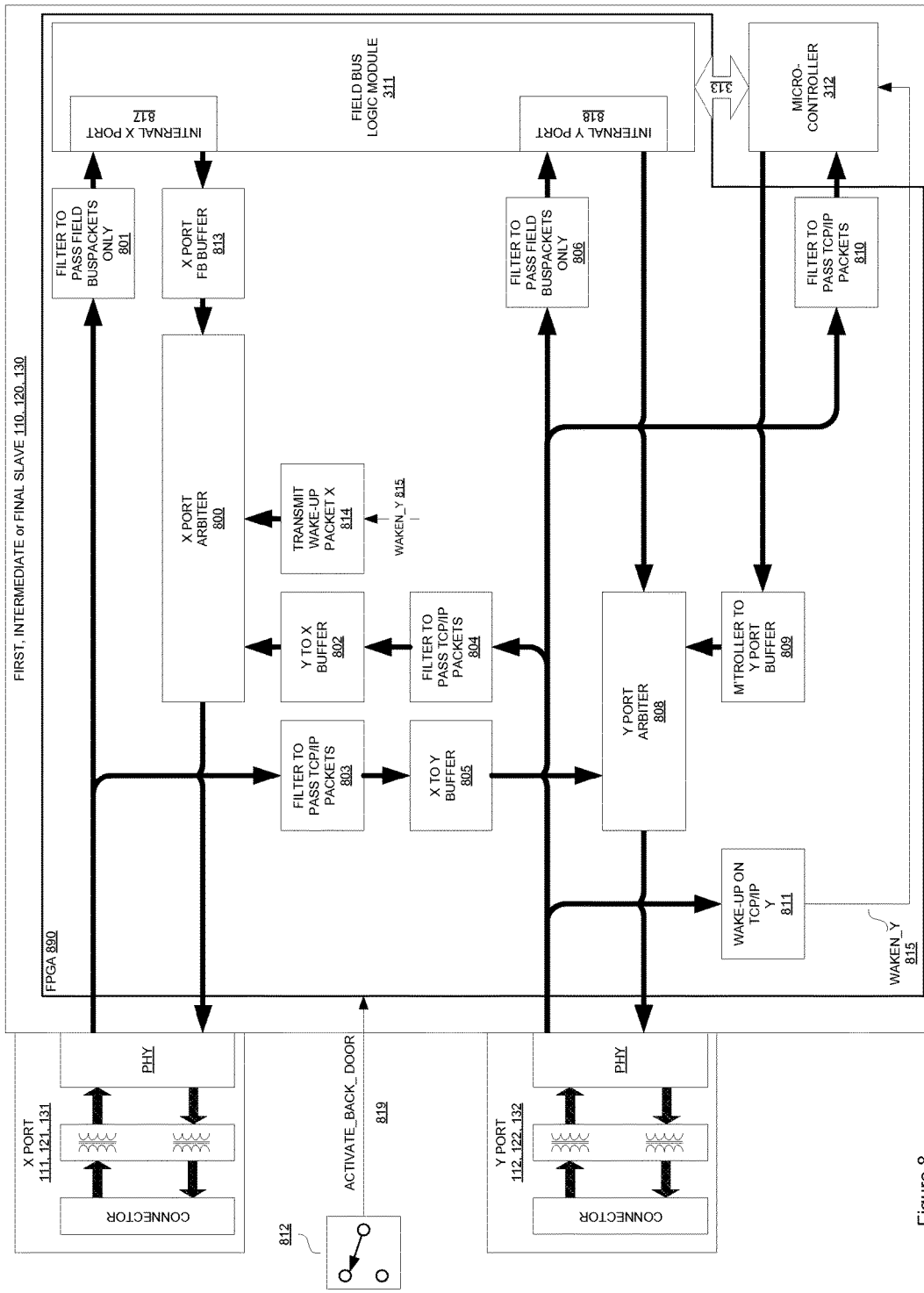
FIG. 8 is a block diagram of some of the internal components of an exemplary first, intermediate or final slave device in accordance with the first embodiment of the present invention.
Figure 14:
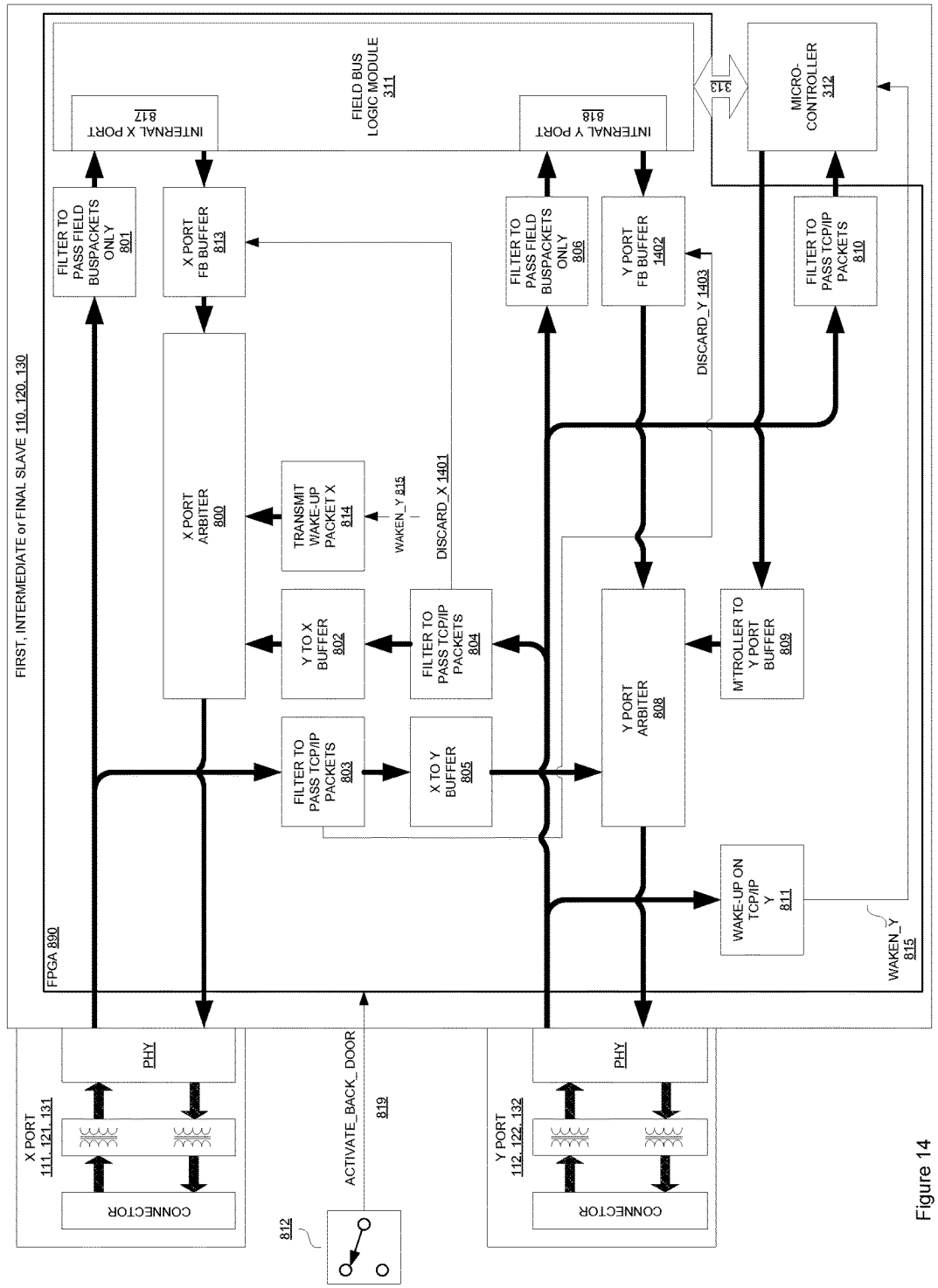
FIG. 14 is a block diagram of some of the internal components of an exemplary first, intermediate or final slave device handling TCP/IP packets accordance with the first embodiment of the present invention.

Implementing accelerated filtering in the logic structure of FPGA in the slave devices of FIG. 8 is illustrated in FIG. 14. A buffer 1402, similar to buffer 813 has been added, the function of blocks 804, 803, 809 and 813 is modified as described below, and control signals 1401 and 1403 are added.

The packets transmitted from the configurator to the final slave, are always TCP/IP packets. Therefore, the final slave, which is configured for back door operation by the setting the back door switch 812, tags all incoming packets from the Y port 132 at filter logic module 804.

Packets transmitted from the microcontroller 312 in any slave 110, 120, 130, are always TCP/IP packets. The final slave 130 transmits directly to the configurator 240 and must not send tagged packets to the configurator. Therefore, only the first and intermediate slave devices 110, 120, tag these packets at buffer logic module 809.

In the final slave 130, filter logic module 803 is configured to strip off the tags from TCP/IP packets that have been received from the other slave devices 110, 120 via the X port 131.

By adding tags to the TCP/IP packets, these packets flowing towards configurator 240 via network cable 113 and 123 are tagged but the stripping that occurs at the final node 130 ensures that TCP/IP packets that flow to the configurator through the network cable 133 have standard, untagged preambles.

Similarly, the TCP/IP packets flowing towards first and intermediate slave devices 110, 120 through cables 113 and 123 are also tagged. As previously described, all TCP/IP packets are blocked in the first slave 110, and therefore do not flow through field bus 103 to the master 100.

In first and intermediate slave devices 110, 120, but not in the final slave 130, filter logic module 804 detects a TCP/IP packet presented to its respective Y port by examining the start of preamble. If a tag is detected then the packet is deemed to be a TCP/IP packet. The final slave 130 is designated as such by the ACTIVATE_BACK_DOOR signal 819. In the final slave 130 all packets received on the Y port are deemed to be TCP/IP packets. Filter logic module 804 passes the whole of the TCP/IP packet to buffer 802 to await transmission. At the instant that the tag is detected, filter logic module 804 asserts the DISCARD_X signal 1401. Meanwhile, filter logic module 806 has been forwarding the TCP/IP packet to field bus logic module 311, which in turn has been forwarding the preamble to X port buffer 813. This process continues until filter 806 inspects the Ethertype field, whereupon filter logic module 806 truncates the packet, thus sending a runt packet to buffer 813. As described above, buffer 813 is only long enough to create the inter-packet gap shown in FIG. 13. When buffer 813 receives the active DISCARD_X signal 1401 it ignores what the field bus logic module sends to it and instead fills up with idle symbols. This action prevents the runt packet created by filter 806 from reaching the X port.

In first and intermediate slave devices 110, 120, but not in the final slave 130, filter 803, DISCARD_Y signal 1403 and buffer 1402 work in a similar fashion to filter 804, DISCARD_X signal 1401 and buffer 813 respectively. Accordingly, TCP/IP packets pass from the X port to the Y port and the runt packets created by filter 801 are blocked by buffer 1402.

In the final slave 130, the field bus packets loop back as shown in FIG. 9, and therefore there is no potential to create runt packets in filter 806.

This arrangement can be modified so that filters 801 and 806 are not integrated into the field bus logic module 311, and instead DISCARD_X signal 1401 is connected to filter 801 and DISCARD_Y signal 1403 is connected to filter 806.

In first and intermediate slave devices 110, 120, but not in the final slave 130, filter logic module 810 could use accelerated filtering, that is inspect the preamble rather than the Ethertype field. The benefit of using accelerated filtering at filter logic module 810 is simply to save logic gates. In the final slave 130 filter logic module 810 cannot use accelerated filtering as the incoming TCP/IP from the Y port packets are not tagged. However, instead filter logic module 810 can be configured to pass all packets as all of the packets that reach it will be TCP/IP packets.

Figure 15:
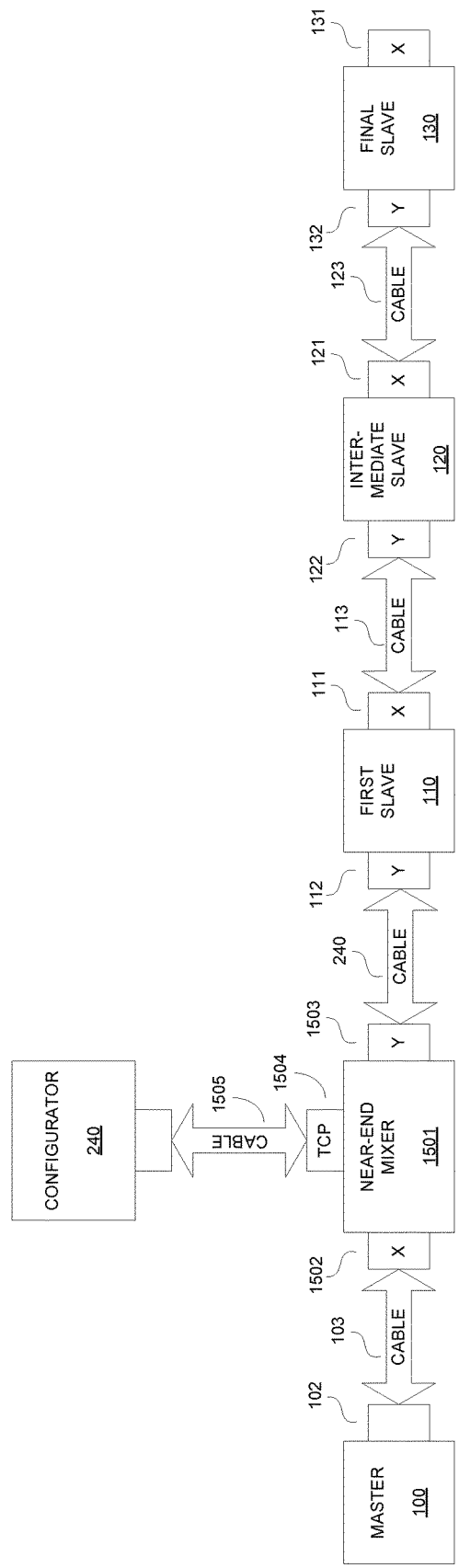

As an alternative to connecting configurator 240 directly to the final slave node 130 as illustrated in FIG. 7, the configurator 240 can be connected using a mixer, such as those illustrated in FIGS. 15-20. FIG. 15 is a block diagram illustrating the configurator connected near master 100. As illustrated in FIG. 15, a near-end mixer 1501, coupled between master 100 and first slave 110, is configured to couple configurator 240 to the slave devices. Near-end mixer 1501 receives TCP/IP packets received at its TCP port 1504 and forwards the packets to the Y port 1503. Conversely, TCP/IP packets received at the near-end mixer's Y port 1503 are forwarded to the TCP port 1504. Field bus packets received at its X port 1502 are forwarded to its Y port 1503, and field bus packets received at its Y port 1503 are forwarded to its X port 1504.

For most field busses no changes are required to slave devices 110, 120, and 130 but since the TCP/IP packets are now received on the upstream port, it is the Y port which must serve that role, thus the X and Y ports of slave devices 110, 120 and 130 in FIG. 15 are reversed in comparison with FIG. 7. Some field busses require the incoming packets to appear on a specific port, in such cases internal X port 817 and the internal Y port 818 on the field bus logic module 311 must also be exchanged with one another within each slave device. It should be noted the back door switch 812 is not required in the configuration of FIG. 15 because TCP/IP wake-up will take place at all nodes using wake-up packets.

Figure 17:
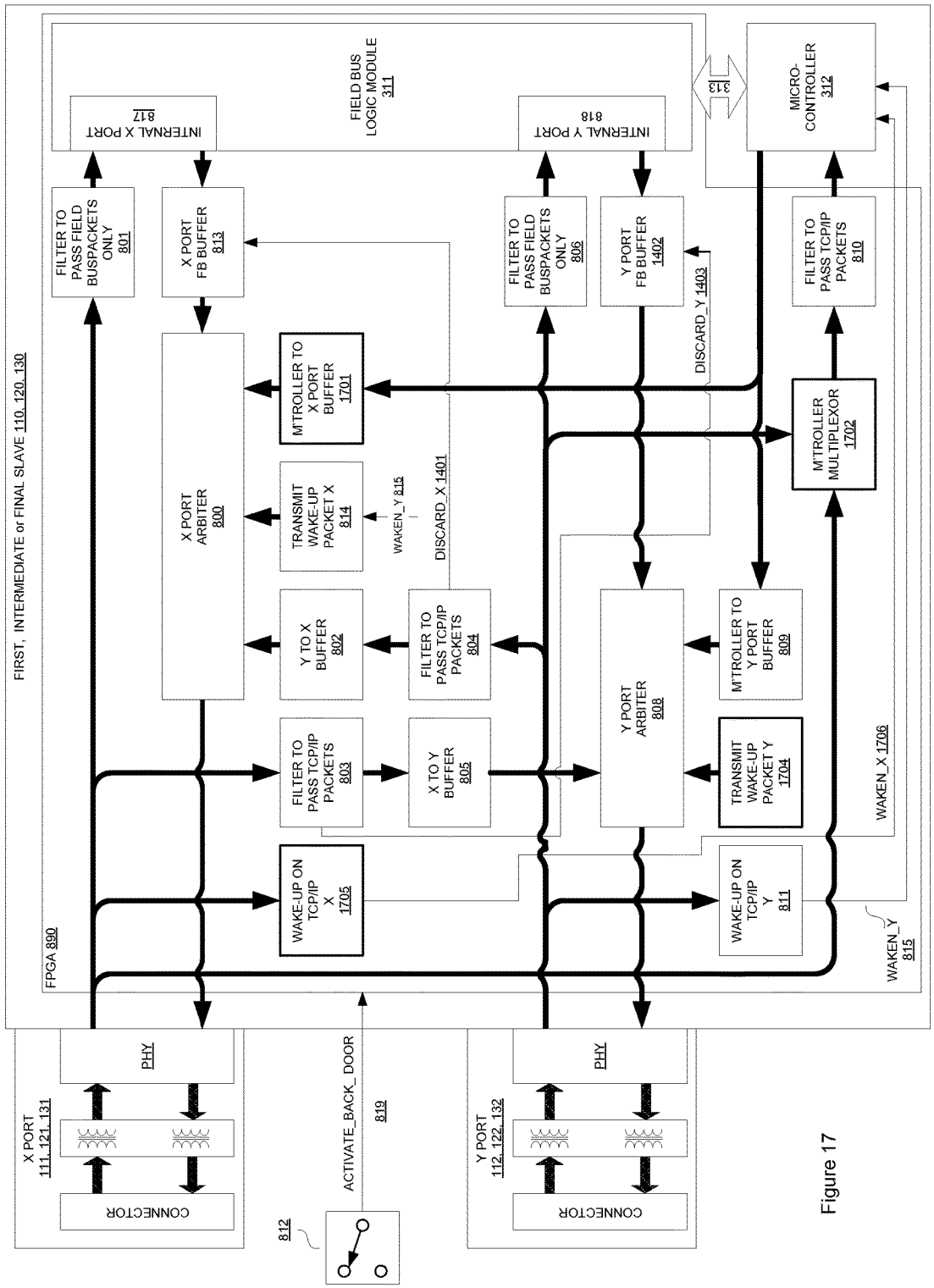
FIG. 17 is a block diagram of some of the internal components of an exemplary slave device and the major internal connections accordance with the second embodiment of the present invention.

It may be further desirable to be able to connect a configurator 240, to one end of the network or the other end of the network depending upon is what is convenient on a given occasion without re-wiring the slave nodes, the variant networks are shown in FIGS. 16a and 16b. To achieve this goal requires that transmission and reception of TCP/IP packets and TCP/IP activation must be able to occur on either the X or Y port. This requires for further logic modules to be added to the slave node as depicted in FIG. 17.

In all slave devices, logic module WAKE-UP ON TCP/IP X 1705 asserts WAKEN_X signal 1706 when a TCP/IP packet is received on the X port. WAKEN_X signal 1706 returns to false if no further TCP/IP packet is received on the X port within 200 ms. This is analogous to the function of logic module 811 with respect to the Y port.

In all slave devices, logic module 1704 attempts to send the special wake-up packet via the Y port on a periodic basis, for example every 100 ms. Arbiter 808 may defer transmission in the event that packet transmission is in progress from buffer 805 or buffer 809 or buffer 1402. This is analogous to the function of logic module 814 with respect to the X port.

Microcontroller multiplexor 1702 routes packets from the X port to filter logic module 810 if signal WAKEN_X 1706 is true. Microcontroller multiplexor 1702 routes packets from the Y port to filter logic module 810 if signal WAKEN_Y 815 is true. It should be recognized that, for the price of some extra logic gates, multiplexor 1702 could be replaced by an arbiter and two input buffers, this would allow the microcontroller to receive TCP/IP packets from either the X port or the Y port or even both ports simultaneously.

Microcontroller to Y port buffer 809, is slightly modified in that it only transmits when the configurator is connected upstream from the X port, namely when WAKEN_X signal 1706 is true. For ease of illustration, the connection of WAKEN_X signal 1706 to buffer 809 is not shown in FIG. 17.

Microcontroller to Y port buffer 1701, only transmits when the configurator is connected downstream from the Y port, namely when WAKEN_Y signal 815 is true. For ease of illustration, the connection of WAKEN_Y signal 815 to buffer 1701 is not shown in FIG. 17.

Comparing FIGS. 17 and 14, it can be seen that in FIG. 14 the microcontroller can send TCP/IP packets to Y port only and can receive TCP/IP packets from the Y port only, whereas in FIG. 17 the microcontroller can send TCP/IP packets to X or Y port and can receive TCP/IP packets from the X or Y port. However, only one of these ports can be the active TCP/IP port. The slave node of FIG. 17 is essentially a symmetric version of the slave node of FIG. 14, and the only asymmetric aspect is that ACTIVATE_BACK_DOOR signal 819 activates WAKEN_Y signal 815 and only Y Port 122 is brought into action.

Figure 18:
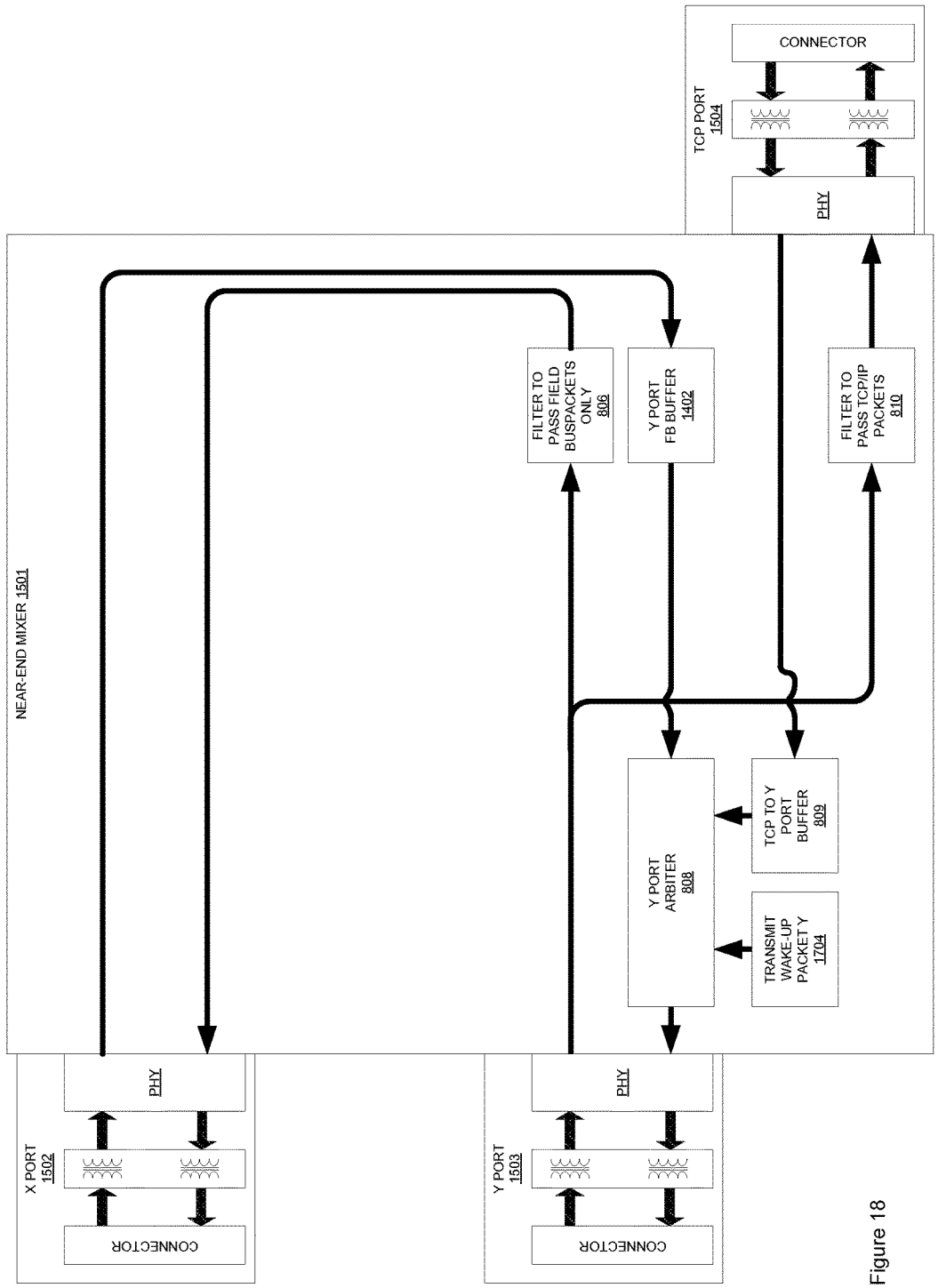
FIG. 18 is a block diagram of some of the internal components of an exemplary mixer in accordance with the second embodiment of the present invention.

FIG. 18 is a block diagram of an exemplary mixer in accordance with the second embodiment of the present invention. The near-end mixer is implemented as logic modules in an FPGA. The logic modules in FIG. 18 are re-used from the slave node design described above in connection with FIG. 17. Field bus packets pass upstream from Y Port 1503 to X port 1502 via filter 806, which blocks the passage of TCP/IP packets. Filter 806 can use the orthodox or accelerated filtering techniques described above. Field bus packets pass downstream from X port 1502 to Y Port 1503 via buffer 1402 and arbiter 808, which gives unconditional priority to the field bus packets to meet the timing requirements of the field bus. TCP/IP packets received on the Y Port 1503 are forwarded to filter 810 and then to TCP Port 1504. Because master 100 is connect to the X port 1502, no TCP/IP packets are received on the X Port 1502. TCP/IP packets received at the TCP Port 1504 pass through buffer 809 and arbiter 808 before being sent downstream via Y Port 1503. Module 1704 sends wake-up packets downstream via arbiter 808 and Y Port 1503. Buffer 809 tags the preamble, filter 810 de-tags the preamble.

Figure 19:
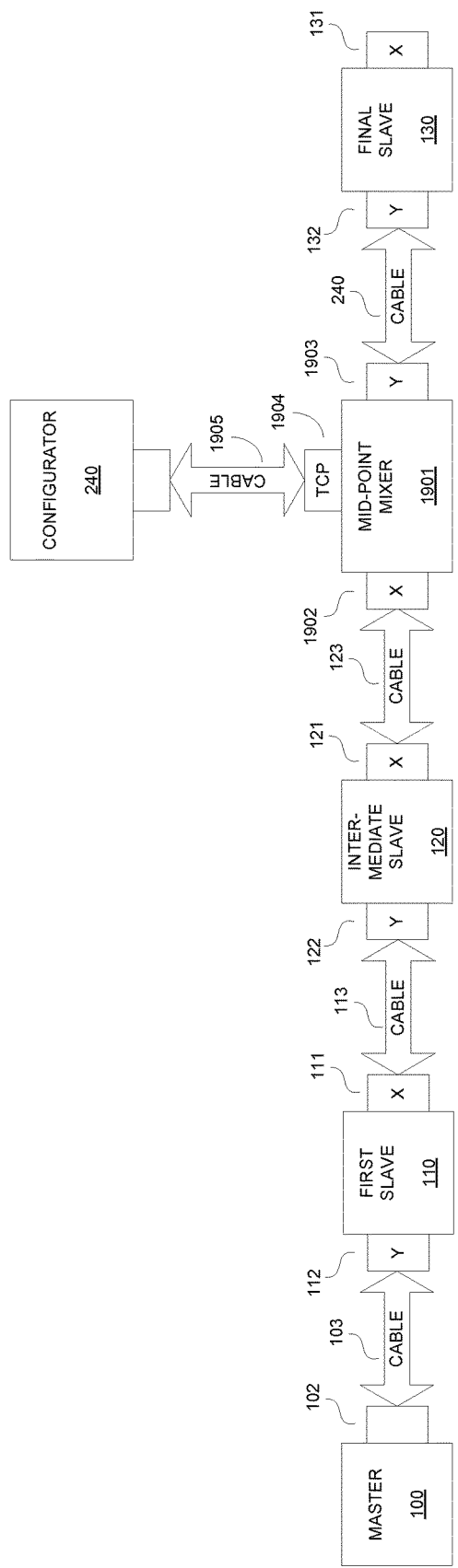
FIG. 19 is a block diagram of an exemplary master-slave with configurator arrangement in accordance with the second embodiment of the present invention.
Figure 20:
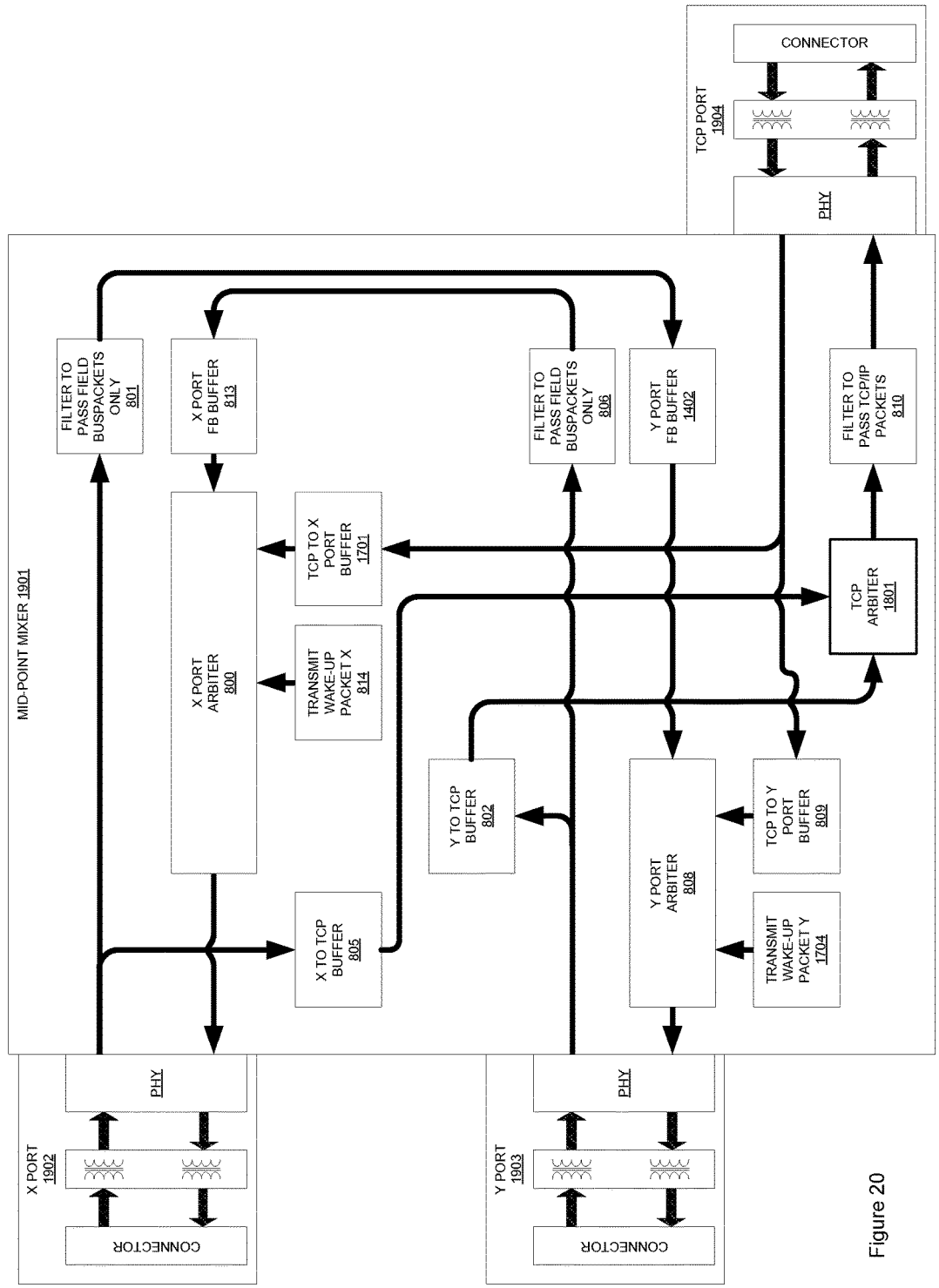
FIG. 20 is a block diagram of some of the internal components of an exemplary mixer in accordance with the second embodiment of the present invention.

Still a further possibility is that the user may wish to connect the configurator between two slave nodes as shown in FIG. 19. In the system of FIG. 19 the slave nodes 110, 120 and 130 are configured as illustrated in FIG. 17. In the system of FIG. 19 the mixer 1901 has slave nodes connected to both the X Port 1902 and the Y Port 1903. Hence, mixer 1901 must be able to forward TCP/IP packets received on the TCP Port out to the X and Y ports and to be able to forward TCP/IP packets from the X and Y ports to the TCP port. Accordingly, the near-end mixer of FIG. 18 is modified as illustrated by the block diagram of a mid-point mixer in FIG. 20. The mid-point mixer of FIG. 20 is essentially a symmetrical version of the near-end mixer of FIG. 18 and will therefore only be described briefly. The only new element is arbiter 1801, which gives fair and equal access to TCP/IP packets received on the X and Y ports. Buffer 809 and buffer 1701 tag the pre-amble, and filter 810 de-tags the pre-amble. The mid-point mixer of FIG. 20 is a modification of the slave node of FIG. 17, the field bus logic module is absent, multiplexor 1702 is replaced by arbiter 1801 (which has multiplexing and arbitration capabilities) and TCP Port 1804 replaces microcontroller 322.

It is evident that mid-point mixer 1901 could serve as a near-point mixer 1501 provided that logic modules 814 and 1701 are disabled, for example, by a switch (not shown) so that the master 100 receives only field bus packets.

Although FIG. 19 illustrates mid-point mixer 1901 being coupled between the intermediate and final slave devices 120, 130, the mid-point mixer 1901 can be coupled between the first and intermediate slave devices 110, 120. Moreover, although the field bus of FIGS. 15 and 19 is in a line topology in each case, it is possible that it could be a ring, for example by connecting final slave 130 back to the master 100. Ring networks are possible in field bus networks, such as EtherCAT and SynqNet compliant field bus networks.

Although exemplary embodiments of the present invention have been described in connection with the non-time-sensitive protocol as being TCP/IP, it should be recognized that the invention is not so limited. The present invention can be employed with any similar type of network protocol, which provides a means of acquiring a network address and a confirmed service, such as Telnet, which has similar unexacting timing requirements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A slave device comprising:
    an upstream network connection port;
    a downstream network connection port;
    a field bus logic module coupled to the upstream and downstream network connection ports adapted to process field bus packets that are formatted, above a physical protocol layer, with a time sensitive protocol;
    a microcontroller coupled to the field bus logic module adapted to process packets of a second type that are formatted, above a physical protocol layer, with a non-time-sensitive protocol;
    logic circuitry adapted to receive packet data and to selectively tag a preamble of a packet to indicate that is a packet of the second type;
    logic circuitry adapted to selectively remove the tag from the preamble of a packet;
    a first packet filter coupled between the field bus logic module and the upstream and downstream network connection ports, the first packet filter is configured to
        pass field bus packets received from the upstream network connection port to the field bus logic module;
        pass field bus packets received from the downstream network connection port to the field bus logic module;
        block a second type of packet from being passed to the field bus logic module; and
    a second packet filter coupled between the downstream network connection port and the microcontroller, wherein the second filter is configured to
        pass a the second type of packet received from the downstream network connection port to the microcontroller;
        block field bus packets from being passed to the microcontroller,
    wherein the first and second packet filters distinguish packets formatted with a non-time-sensitive protocol by inspecting tags inserted into the preamble of the packet; and
    a third packet filter coupled between the downstream and upstream network connection ports of the slave device, wherein the third packet filter is configured to modify the value in the preamble of the second type of packet received from the downstream network connection port of the slave device;
    wherein the first and second packet filters are configured to filter packets based on a value in a header of (1) the field bus packets or (2) the second type of packet, wherein the value is in an Ethertype field of the header of the field bus packets or the second type of packet; and wherein the first and second packet filters are configured to filter packets based on a value in a preamble of (1) the field bus packets or (2) the second type of packet.

2. The slave device of claim 1, further comprising: a fourth packet filter coupled between the downstream and upstream network connection ports of the slave device, wherein the fourth packet filter is configured to modify the value in the preamble of the second type of packet received from the upstream network connection port of the slave device.

3. A network comprising:
   a master device with a downstream network connection port;
   a first slave device with an upstream network connection port coupled serially connected to the downstream network connection port of the master device;
   an intermediate slave device with an upstream network connection port coupled serially connected to a downstream network connection port of the first slave device;
   a final slave device with an upstream network connection port coupled serially connected to a downstream network connection port of the intermediate slave device; and
   a configurator coupled to one of the upstream or downstream network connection ports of one of the first, intermediate or slave devices,
   wherein the first, intermediate and final slave devices are configured to support field bus packets that are formatted, above a physical protocol layer, with a time sensitive protocol and a second type of packet over the network that is formatted, above a physical protocol layer, with a non-time-sensitive protocol;
   wherein each of the first, intermediate, and final slave devices include
      a field bus logic module coupled to the upstream and downstream network connection ports;
      a microcontroller coupled to the field bus logic module;
      logic circuitry adapted to receive packet data and to selectively tag a preamble of a packet to indicate that is a packet of the second type;
      logic circuitry adapted to selectively remove the tag from the preamble of a packet;
      a first packet filter coupled between the field bus logic module and the upstream and downstream network connection ports, the first packet filter is configured to
         pass field bus packets received from the upstream network connection port to the field bus logic module;
         pass field bus packets received from the downstream network connection port to the field bus logic module; and
         block a second type of packet from being passed to the field bus logic module; and
      a second packet filter coupled between the downstream network connection port and the microcontroller, wherein the second packet filter is configured to
         pass the second type of packet received from the downstream network connection port to the microcontroller; and
         block field bus packets from being passed to the microcontroller;
   wherein the first and second packet filters distinguish packets formatted with a non-time-sensitive protocol by inspecting tags inserted into the preamble of the packet;
   wherein the first and second packet filters of each of the first, intermediate, and final slave devices are configured to filter packets based on a value in a preamble of (1) the field bus packets or (2) the second type of packet; and
   the first, intermediate, and final slave devices each further comprise a third packet filter coupled between the downstream and upstream network connection ports of the slave device, wherein the third packet filter is configured to modify the value in the preamble of the second type of packet received from the downstream network connection port of the slave device.

4. The network of claim 3, wherein the configurator is coupled to a downstream port of the final slave device.

5. The network of claim 3, further comprising:
   a mixer coupled to one of the upstream or downstream network connection ports of one of the first, intermediate or slave devices.

6. The network of claim 5, wherein the mixer is coupled between the downstream network connection port of the master device and the upstream network connection port of the first slave device.

7. The network of claim 6, wherein the configurator is coupled to the mixer.

8. The network of claim 6, wherein the configurator is coupled to a downstream port of the final slave device.

9. The network of claim 5, wherein the mixer is coupled between the intermediate and final slave devices or between the first and intermediate slave devices.

* * * * *